US010387476B2

(12) United States Patent
Hanis et al.

(10) Patent No.: US 10,387,476 B2
(45) Date of Patent: Aug. 20, 2019

(54) SEMANTIC MAPPING OF TOPIC MAP META-MODELS IDENTIFYING ASSETS AND EVENTS TO INCLUDE MODELED REACTIVE ACTIONS

(71) Applicant: International Business Machines Corporation, Armonk, NY (US)

(72) Inventors: Thomas T. Hanis, Raleigh, NC (US); Eoin Lane, Littleton, MA (US); Ke Zhang, Beijing (CN); Zhuo Z. Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/949,981

(22) Filed: Nov. 24, 2015

(65) Prior Publication Data

US 2017/0147689 A1   May 25, 2017

(51) Int. Cl.
G06F 17/30 (2006.01)
G06F 16/36 (2019.01)
G06F 16/9032 (2019.01)
G06F 17/00 (2006.01)

(52) U.S. Cl.
CPC ...... *G06F 16/367* (2019.01); *G06F 16/90332* (2019.01)

(58) Field of Classification Search
None
See application file for complete search history.

(56) References Cited

U.S. PATENT DOCUMENTS

| 6,351,715 | B1 * | 2/2002 | Ykema | H02H 3/00 361/614 |
|---|---|---|---|---|
| 7,467,145 | B1 | 12/2008 | Castellanos et al. | |
| 7,664,712 | B1 | 2/2010 | Duvall et al. | |
| 7,962,589 | B1 | 6/2011 | Parello et al. | |
| 8,051,164 | B2 | 11/2011 | De Peuter et al. | |
| 8,301,755 | B2 | 10/2012 | De Peuter et al. | |
| 8,645,904 | B2 | 2/2014 | Coldicott et al. | |

(Continued)

FOREIGN PATENT DOCUMENTS

WO     0042529 A1   7/2000
WO  2011065969 A2   6/2011

(Continued)

OTHER PUBLICATIONS

Jane Hunter "MetaNet A Metadata Term Thesaurus to Enable Semantic Interoperability Between Metadata Domains" (2001), Journal of Digital Information, vol. 1, No. 8.*

(Continued)

*Primary Examiner* — Polina G Peach
(74) *Attorney, Agent, or Firm* — Anthony V. England; Edell, Shapiro & Finnan, LLC

(57) ABSTRACT

Associating a state machine with an asset for impact analysis by creating an asset-and-event topic map meta-model that identifies assets and events in a topic map based index with instance ontology based on a topic map meta model that identifies assets and a topic map meta-model that identifies events; creating a state topic map meta-model representing operating states of at least one asset; and associating an asset of the asset-and-event topic map meta-model with operating states of the asset in the state topic map meta-model.

13 Claims, 19 Drawing Sheets

(56) References Cited

U.S. PATENT DOCUMENTS

| | | | |
|---|---|---|---|
| 8,706,771 B2* | 4/2014 | Gass | G06F 9/44536 707/803 |
| 9,123,004 B2 | 9/2015 | Coldicott et al. | |
| 9,535,978 B2 | 1/2017 | Coldicott et al. | |
| 10,042,915 B2 | 8/2018 | Hanis et al. | |
| 2002/0161674 A1* | 10/2002 | Scheer | G06Q 10/0631 705/28 |
| 2003/0233365 A1* | 12/2003 | Schmit | G06F 17/30864 |
| 2004/0034652 A1 | 2/2004 | Hofmann et al. | |
| 2004/0093344 A1* | 5/2004 | Berger | G06F 17/30604 |
| 2005/0289166 A1* | 12/2005 | Stanley | G06F 17/30286 |
| 2006/0190368 A1 | 8/2006 | Kesterman | |
| 2007/0006177 A1 | 1/2007 | Aiber et al. | |
| 2007/0027666 A1 | 2/2007 | Frankel | |
| 2007/0074076 A1 | 3/2007 | Imai et al. | |
| 2007/0130231 A1* | 6/2007 | Brown | G06F 11/3409 |
| 2007/0288219 A1 | 12/2007 | Zafar et al. | |
| 2008/0033993 A1 | 2/2008 | Uceda-Sosa | |
| 2008/0125942 A1 | 5/2008 | Tucker et al. | |
| 2008/0307523 A1* | 12/2008 | Subramanyam | G06F 17/30731 726/21 |
| 2009/0044129 A1* | 2/2009 | Ebrom | G06F 8/34 715/738 |
| 2009/0157419 A1* | 6/2009 | Bursey | H04W 4/70 705/346 |
| 2009/0248488 A1 | 10/2009 | Shah et al. | |
| 2009/0287674 A1 | 11/2009 | Bouillet et al. | |
| 2009/0299696 A1 | 12/2009 | Shiihara et al. | |
| 2009/0327242 A1* | 12/2009 | Brown | G06F 16/24542 |
| 2010/0049564 A1 | 2/2010 | Lewis et al. | |
| 2010/0070448 A1* | 3/2010 | Omoigui | H01L 27/1463 706/47 |
| 2010/0100546 A1* | 4/2010 | Kohler | G06F 17/30017 707/739 |
| 2010/0162401 A1 | 6/2010 | Sakaki | |
| 2011/0035391 A1* | 2/2011 | Werner | G06F 17/30731 707/756 |
| 2011/0099050 A1 | 4/2011 | Coldicott et al. | |
| 2011/0099139 A1 | 4/2011 | Coldicott et al. | |
| 2011/0099536 A1 | 4/2011 | Coldicott et al. | |
| 2011/0153636 A1* | 6/2011 | Coldicott | G06F 17/3089 707/769 |
| 2011/0169835 A1 | 7/2011 | Cardno et al. | |
| 2010/0228693 A1 | 1/2012 | Dawson et al. | |
| 2012/0016858 A1 | 1/2012 | Rathod | |
| 2013/0173523 A1 | 1/2012 | Sanchez et al. | |
| 2012/0102050 A1* | 4/2012 | Button | G06F 17/30867 707/749 |
| 2012/0102371 A1 | 4/2012 | Tonouchi | |
| 2012/0137367 A1* | 5/2012 | Dupont | G06F 21/00 726/25 |
| 2012/0155715 A1 | 6/2012 | Buscema | |
| 2012/0278353 A1 | 11/2012 | Carrato et al. | |
| 2013/0262367 A1 | 10/2013 | Coldicott et al. | |
| 2013/0332240 A1* | 12/2013 | Patri | G06Q 10/06 705/7.36 |
| 2013/0339375 A1* | 12/2013 | Adayikkoth | G06F 11/3006 707/754 |
| 2013/0346596 A1* | 12/2013 | Balakrishnan | H04L 63/1425 709/224 |
| 2014/0280228 A1 | 9/2014 | Coldicott et al. | |
| 2014/0282404 A1 | 9/2014 | Gonsalves et al. | |
| 2014/0324393 A1* | 10/2014 | Alfassi | G06F 17/5009 703/1 |
| 2014/0344555 A1 | 11/2014 | Ramanarayanan et al. | |
| 2015/0066827 A1 | 3/2015 | Brereton et al. | |
| 2015/0067569 A1 | 3/2015 | Brereton et al. | |
| 2015/0081689 A1 | 3/2015 | Marshall | |
| 2015/0178300 A1 | 6/2015 | Roy et al. | |
| 2016/0085810 A1* | 3/2016 | de Castro Alves | G06F 16/24568 707/752 |
| 2016/0247246 A1 | 8/2016 | Bluestone et al. | |
| 2017/0091304 A1 | 3/2017 | Hanis et al. | |

FOREIGN PATENT DOCUMENTS

| | | |
|---|---|---|
| WO | 2011065969 A3 | 6/2011 |
| WO | 2012106922 A1 | 8/2012 |
| WO | 2013138969 A1 | 9/2013 |
| WO | 2013159639 A1 | 10/2013 |

OTHER PUBLICATIONS

Lacher et al. "On the Integration of Topic Maps and RDF Data", Extreme Markup Languages 2001; Aug. 2001.

Bailey et al. "Flavours of XChange, a Rule-Based Reactive Language for the (Semantic) Web", Rules and Rule Markup Languages for the Semantic Web; vol. 3791 of the series Lecture Notes in Computer Science pp. 187-192; Nov. 2005.

Heidinger et al. "Towards Collaborative Web-Based Impact Assessment", Proceedings of the 10th Annual International Conference on Digital Government Research: Social Networks: Making Connections between Citizens, Data and Government pp. 190-198; 2009.

Ruther et al. "SNS Environmental Vocabulary—from Terms to Ontology", Semantics 2006 Vienna, Nov. 28-30, 2006.

Ruther, "Sharing Environmental Vocabulary", EnviroInfo 2004 (Geneva), p. 293-295, 18th International Conference "Infomatics for Environmental Protection", Geneva 2004.

Kim et al, "Cause- and-Effect Function Analysis", Proceedings of the 2010 IEEE ICMIT.

Potgieter et al, "Adaptive Bayesian agents: Enabling distributed social networks", S. Afr.J.Bus.Manage.2006, 37(1).

Reusch et al, "Integrated Tool Sets for Business Games and Simulation", Computing, 2008, vol. 7, Issue 2, 59-65.

Rouse, "Topic Map Query language (TMQI)", Sep. 2005.

Weighted edges in topic maps, Google Forum Groups; retrieved from https://groups.google.com/forum/?fromgroups#!topic/ontopia/cBZqr73vOal; Oct. 2010.

Schaefer et al., Smarter City Series: Understanding the IBM approach to Traffic Management, 2011, http://ip.com/pdf/redbook/REDP473700.pdf.

Le Grand et al., Topic Maps, RDF Graphs and Ontologies Visualization, Jan. 1, 1999, http://www-rp.lip6.fr/~blegrand/Publis/VSW_book.pdf.

U.S. Appl. No. 13/433,384; Non-Final Rejection dated May 1, 2014.
U.S. Appl. No. 13/433,384; Final Rejection dated Sep. 10, 2014.
U.S. Appl. No. 13/433,384; Non-Final Rejection dated Dec. 24, 2014.
U.S. Appl. No. 14/293,292; Non-Final Rejection dated Feb. 25, 2016.
U.S. Appl. No. 14/018,872; Non-Final Rejection dated Jul. 22, 2015.
U.S. Appl. No. 14/081,241; Non-Final Rejection dated Sep. 3, 2015.
U.S. Appl. No. 14/081,241; Final Rejection dated Mar. 11, 2016.
U.S. Appl. No. 14/018,872; Final Rejection dated Apr. 8, 2015.

Becker, T., et al. "Semantic 30 modeling of multi-utility networks in cities for analysis and 30 visualization". (2012). [retrieved from <http://www.mediatum.ub.tm.de>].

Corbo, J., et al. "An economically-principled generative model of AS graph connectivity." INFOCOM 2009, IEEE. IEEE, 2009.

Zhang et al. "Cloud computing: state-of-the-art and research challenges." Journal of internet services and applications 1.1 (2010): 7-18.

U.S. Appl. No. 14/081,241; Final Rejection dated Feb. 22, 2017.
U.S. Appl. No. 14/018,872; Final Rejection dated Feb. 22, 2017.
U.S. Appl. No. 14/081,241:Non-Final Rejection dated Sep. 20, 2016.
U.S. Appl. No. 14/018,872; Non-Final Rejection dated Sep. 20, 2016.

Fakcharoenphol et al. "Planar graphs, negative weight edges, shortest paths, and near linear time." Foundations of Computer Science, 2001. Proceedings. 42nd IEEE Symposium on. IEEE, 2001.

Kehoe et al. "Smarter cities series: a foundation for understanding IBM smarter cities", Redguides for Business Leaders, IBM; 2011.

(56) References Cited

OTHER PUBLICATIONS

U.S. Appl. No. 14/081,241; Non-Final Rejection dated Aug. 16, 2017.
U.S. Appl. No. 14/018,872; Non-Final Rejection dated Aug. 16, 2017.
U.S. Appl. No. 14/867,156; Non Final Rejection dated Oct. 6, 2017.
U.S. Appl. No. 14/081,241; Final Rejection dated Mar. 7, 2018.
U.S. Appl. No. 14/081,872; Final Rejection dated Mar. 7, 2018.
Hunter, J. "MetaNet a Metadata Term Thesaurus to Enable Semantic Interoperability Between Metadata Domains", Journal of Digital Information, vol. 1, No. 8, 2001, 19 pages.

* cited by examiner

305

305

SEMANTIC MAPPING OF TOPIC MAP META-MODELS IDENTIFYING ASSETS AND EVENTS TO INCLUDE MODELED REACTIVE ACTIONS

BACKGROUND

The present invention relates to semantic mapping, and more specifically to semantic mapping of a first topic map meta-model identifying assets to a second topic map meta-model identifying events to form a third topic map meta-model that represents a semantic mapping of assets to events and including modeled reactive actions in another topic map meta-model of at least one asset.

Manufacturing and production based companies have enormous investments in assets and physical infrastructure that are part of the operational processes that drive their business. Optimizing the use of those assets is critical to a company's operational effectiveness and therefore its profitability.

Often times, companies will leverage asset optimization solutions to monitor key performance indicators, leverage analytics to anticipate warning or failure conditions, to schedule maintenance, and optimize resource scheduling against anticipated workload.

One aspect of optimization solutions is the understanding of the relationships between assets and events that could affect them directly or indirectly.

The equipment or assets that run the manufacturing or production processes are generally connected to servers or controllers to generate operational data that can be used to monitor the manufacturing or production process. Typically, companies will collect the operational data and perform operational analysis to provide immediate performance characteristics that can often be represented in dashboards, score sheets, or reports. Information models can be used to represent how assets are deployed and the relationships between assets such as connections, associations or containment. Armed with both the model information and the "real time" operational data, organizations can perform current or future condition analyses on assets and asset groups.

Similarly, organizations may use event models to understand relationships between events within their physical infrastructure. These event models may be explicitly defined, or they could be implicit in the deployment of business operational processes. These processes could be programmatic, rule based, or supplied by a knowledge expert. But independent of how they are manifested, they represent relationships between events that occur within the operational process. For example, the event model would be able to tell a customer what response needs to occur if a critical piece of equipment is operating over a specific threshold, for example running too hot or consuming too much power.

SUMMARY

According to one embodiment of the present invention a method of associating a state machine with an asset for impact analysis is disclosed. The method comprising the steps of: a computer creating an asset-and-event topic map meta-model that identifies assets and events in a topic map based index with instance ontology based on a topic map meta model that identifies assets and a topic map meta-model that identifies events; the computer creating a state topic map meta-model representing operating states of at least one asset; and the computer associating an asset of the asset-and-event topic map meta-model with operating states of the asset in the state topic map meta-model.

According to another embodiment of the present invention, a computer program product for associating a state machine with an asset for impact analysis is disclosed. The computer program product comprising a computer comprising at least one processor, one or more memories, one or more computer readable storage media, the computer program product comprising a computer readable storage medium having program instructions embodied therewith. The program instructions executable by the computer to perform a method comprising: creating, by the computer, an asset-and-event topic map meta-model that identifies assets and events in a topic map based index with instance ontology based on a topic map meta model that identifies assets and a topic map meta-model that identifies events; creating, by the computer, a state topic map meta-model representing operating states of at least one asset; and associating, by the computer, an asset of the asset-and-event topic map meta-model with operating states of the asset in the state topic map meta-model.

According to another embodiment of the present invention, a computer system for associating a state machine with an asset for impact analysis is disclosed. The computer system comprising a computer comprising at least one processor, one or more memories, one or more computer readable storage media having program instructions. The program instructions executable by the computer to perform the program instructions comprising: creating, by the computer, an asset-and-event topic map meta-model that identifies assets and events in a topic map based index with instance ontology based on a topic map meta model that identifies assets and a topic map meta-model that identifies events; creating, by the computer, a state topic map meta-model representing operating states of at least one asset; and associating, by the computer, an asset of the asset-and-event topic map meta-model with operating states of the asset in the state topic map meta-model.

DETAILED DESCRIPTION

Figure 1:
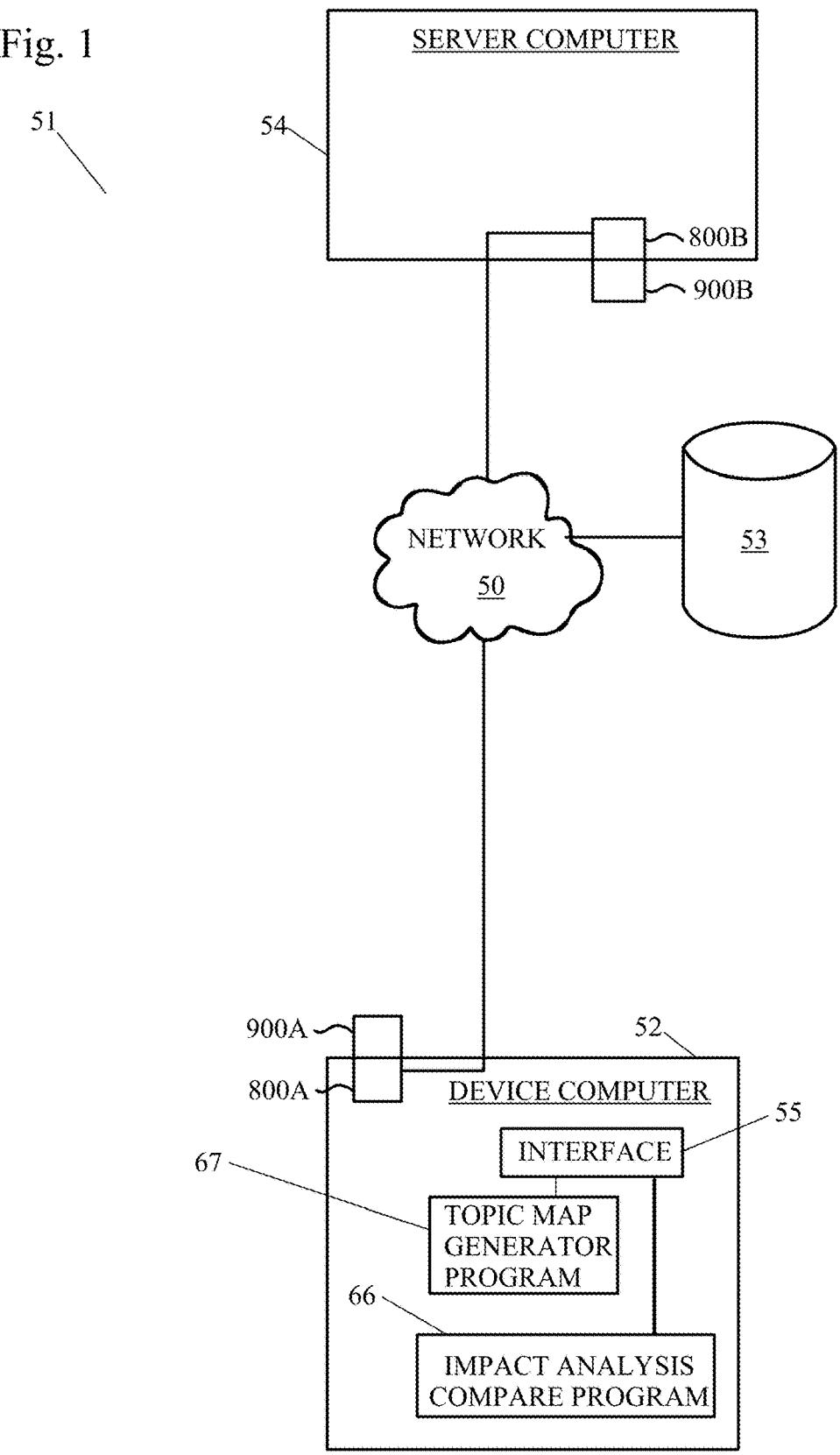
FIG. 1 depicts an exemplary diagram of a possible data processing environment in which illustrative embodiments may be implemented.

The illustrative embodiments recognize that, for effective operations, companies want to be able to answer more complicated questions about the operations of their equipment and/or assets and the result of various types of events. Examples are questions like: "What are the implications of this piece of equipment exceeding a threshold to other assets in my enterprise?" "Will there be upstream or downstream effects from exceeding the threshold on assets in my enterprise?" "What are upstream or downstream implications to assets that are related by proximity, direct or indirect physical connection based on configurations that exist now or that could change by operational cycles or time?" "What is command flow between assets when an event occurs?" "What are the dispersion patterns based on graph edge resistance (e.g. workload dispersal)?" "What is the SIM connectivity between devices?" The illustrative embodiments recognize that these questions are critical to a highly effective operational process and span the boundaries typically maintained by asset models and event models individually.

The illustrative embodiments recognize that models, such as asset models and event models, are deployed in relative isolation and do not provide a semantic understanding between the models. The illustrative embodiments also recognize that simply expanding the model definitions to attempt to include any relationship across the separate models, sacrifices the benefits associated with specifically focused models. Illustrative embodiments provide for interaction between individual models so that the collective values of the individual models can be fully leveraged to drive optimal business efficiencies. The collective values of the individual models and the interactions between the individual models may be stored in a separate meta-model with associated metadata which can be leveraged.

The term "state machine" may include the different states of a machine can be in, current condition of a machine, state transfer information between states, and other information regarding state. The state machine may be represented by a state model. A machine or an asset can be in only one state at a time. A machine or an asset can change from one state to another when initiated by an event and state transfer information regarding this change may be present in the state model. The state machine may be represented by a topic map representation of the state model.

An event may have an impact on one or more assets and the impacted assets can also impact other assets, which have dependencies upstream/downstream and may affect the state of an asset in the same infrastructure or network.

Topic maps are a standard for the representation and interchange of knowledge. A topic map represents information using topics, associations, and occurrences. Topics may represent any concept. Associations represent hypergraph relationships between topics. Occurrences represent information resources relevant to a particular topic. Topics, associations and occurrences are all typed, where the types must be defined by the creator of the topic map. The definition of the allowed types of the topic map is the ontology.

It should be noted that topic maps support merging between multiple topics or topic maps. Since the ontologies are the topic maps themselves, the ontologies can also be merged thus allowing for the automated integration of information from diverse sources into a coherent new topic map.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, client computer 52, storage unit 53, and server computer 54 connect to network 50. In other exemplary embodiments, network data processing system 51 may include additional client computers, storage devices, server computers, and other devices not shown. Client computer 52 includes a set of internal components 800a and a set of external components 900a, further illustrated in FIG. 19. Client computer 52 may be, for example, a mobile device, a cell phone, a personal digital assistant, a netbook, a laptop computer, a tablet computer, a desktop computer, or any other type of computing device. Client computer 52 may contain an interface 55. Through interface 55, users may view different topic maps as well as a topic map meta-model which includes associations between assets and events. Additionally, through interface 55, any representation, for example graphs, of at least the current state of an asset may be displayed on the topic map including associations between assets and events, as well as state of an asset. Interface 55 may accept commands and data entry from a user, such as additional events, assets, or queries. Interface 55 can be, for example, a command line interface, a graphical user interface (GUI), or a web user interface (WUI) through which a user can access an impact analysis compare program 66 and/or a topic map generator program 67 on client computer 52, as shown in FIG. 1, or alternatively on server computer 54. Server computer 54 includes a set of internal components 800b and a set of external components 900b illustrated in FIG. 19.

In the depicted example, server computer 54 provides information, such as boot files, operating system images, and applications to client computer 52. Server computer 54 can compute the information locally or extract the information from other computers on network 50.

Figure 19:
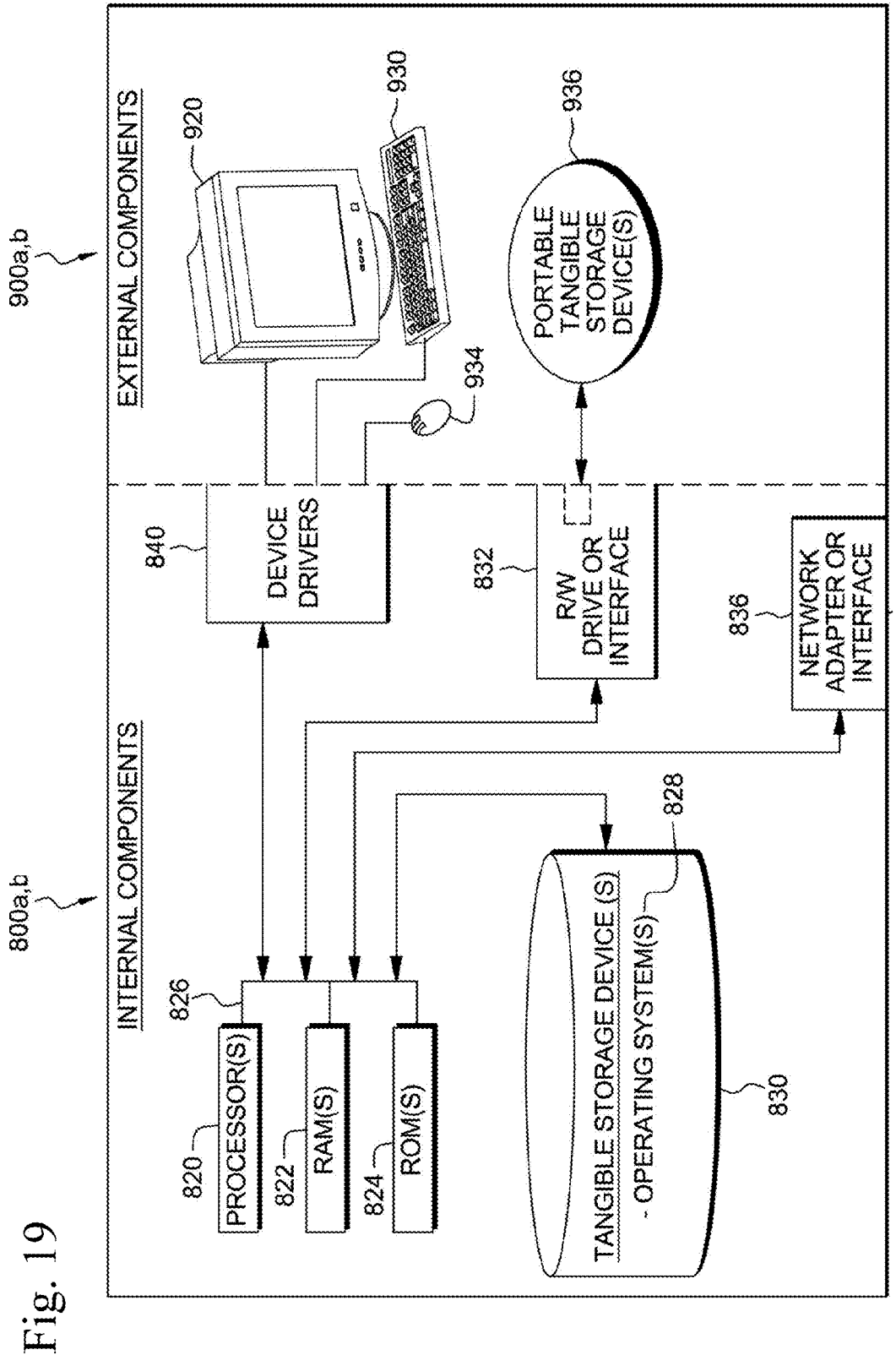
FIG. 19 illustrates internal and external components of a client computer and a server computer in which illustrative embodiments may be implemented.

Program code, meta-models, models identifying assets, models identifying events, models representing semantic mapping of assets to events, data structures identifying a state machine of an asset, and programs such as topic map generator program 67 and impact analysis compare program 66 may be stored on at least one of one or more computer-readable tangible storage devices 830 shown in FIG. 19, on at least one of one or more portable computer-readable tangible storage devices 936 as shown in FIG. 19, or on storage unit 53 connected to network 50, or may be downloaded to a computer, such as client computer 52 or server computer 54, for use. For example, program code, meta-models, models identifying assets, models identifying events, data structures identifying a state machine of an asset, and programs such as topic map generator program 67 and impact analysis compare program 66 may be stored on at least one of one or more storage devices 830 on server computer 54 and downloaded to client computer 52 over network 50 for use on client computer 52. Alternatively, server computer 54 can be a web server, and the program code, meta-models, models identifying assets, models identifying events, data structures identifying a state machine of an asset, and programs such as topic map generator program 67 and impact analysis compare program 66 may be stored on at least one of the one or more storage devices 830 on server computer 54 and accessed on client computer 52. Topic map generator program 67 and impact analysis compare program 66 can be accessed on client computer 52 through interface 55. In other exemplary embodiments, the program code, meta-models, models identifying assets, models identifying events, data structures identifying a state machine of an asset, and programs such as topic map generator program 67 and impact analysis compare program 66 may be stored on at least one of one or more computer-readable storage devices 830 on client computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 2:
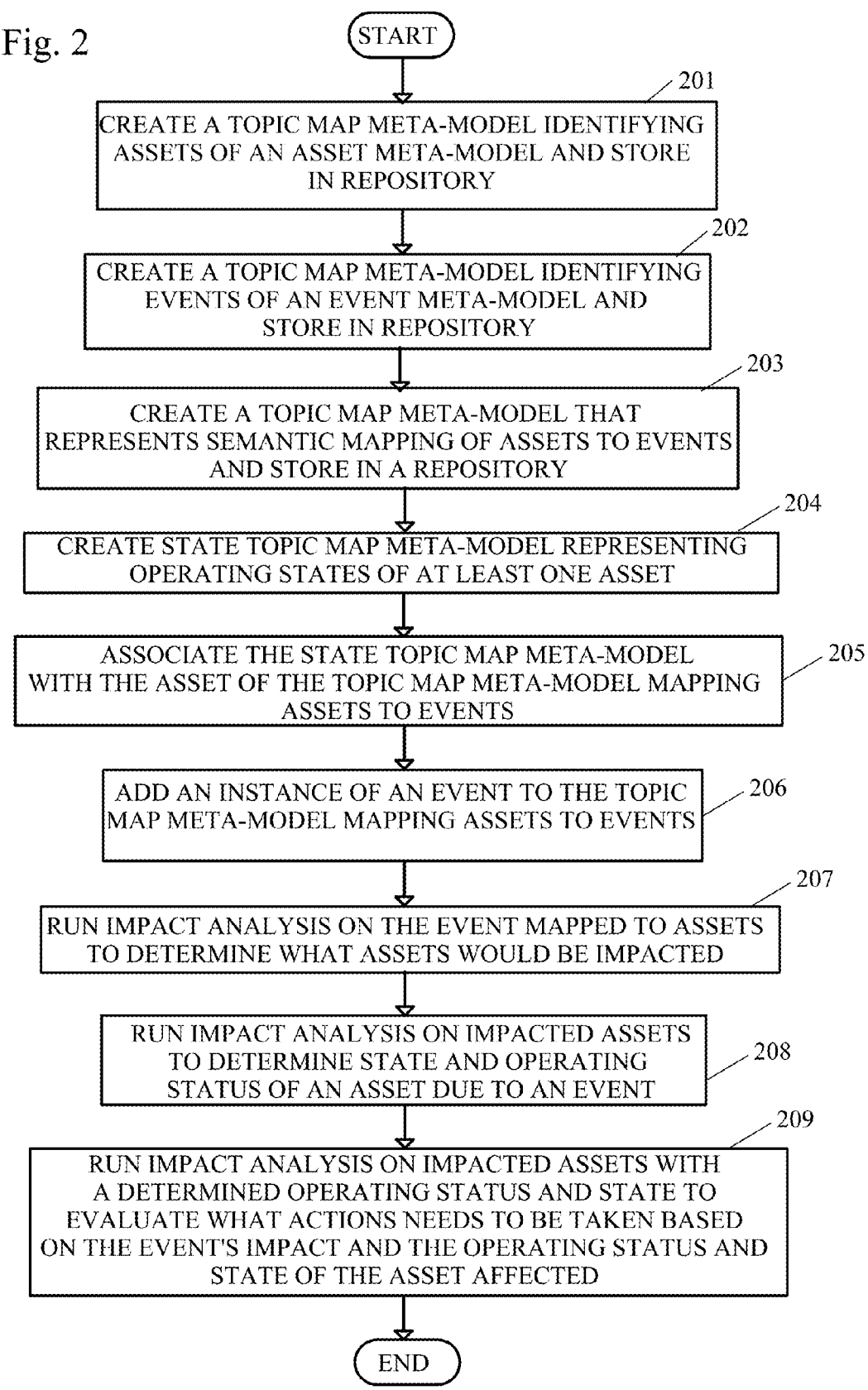
FIG. 2 shows a flowchart of a method of semantically mapping a first topic map meta-model identifying assets to a second topic map meta-model identifying events to form a third topic map meta model that represents semantic mapping of assets to events and mapping a state machine to at least one asset, the state machine aiding in impact analysis of an event on an asset of an illustrative embodiment.

FIG. 2 shows a flowchart of a method of semantically mapping a first topic map meta-model identifying assets to a second topic map meta-model identifying event types to form a third topic map meta model that represents semantic mapping of assets to events, and mapping a state machine to at least one asset, the state machine aiding in impact analysis of an event on an asset.

Figure 3:
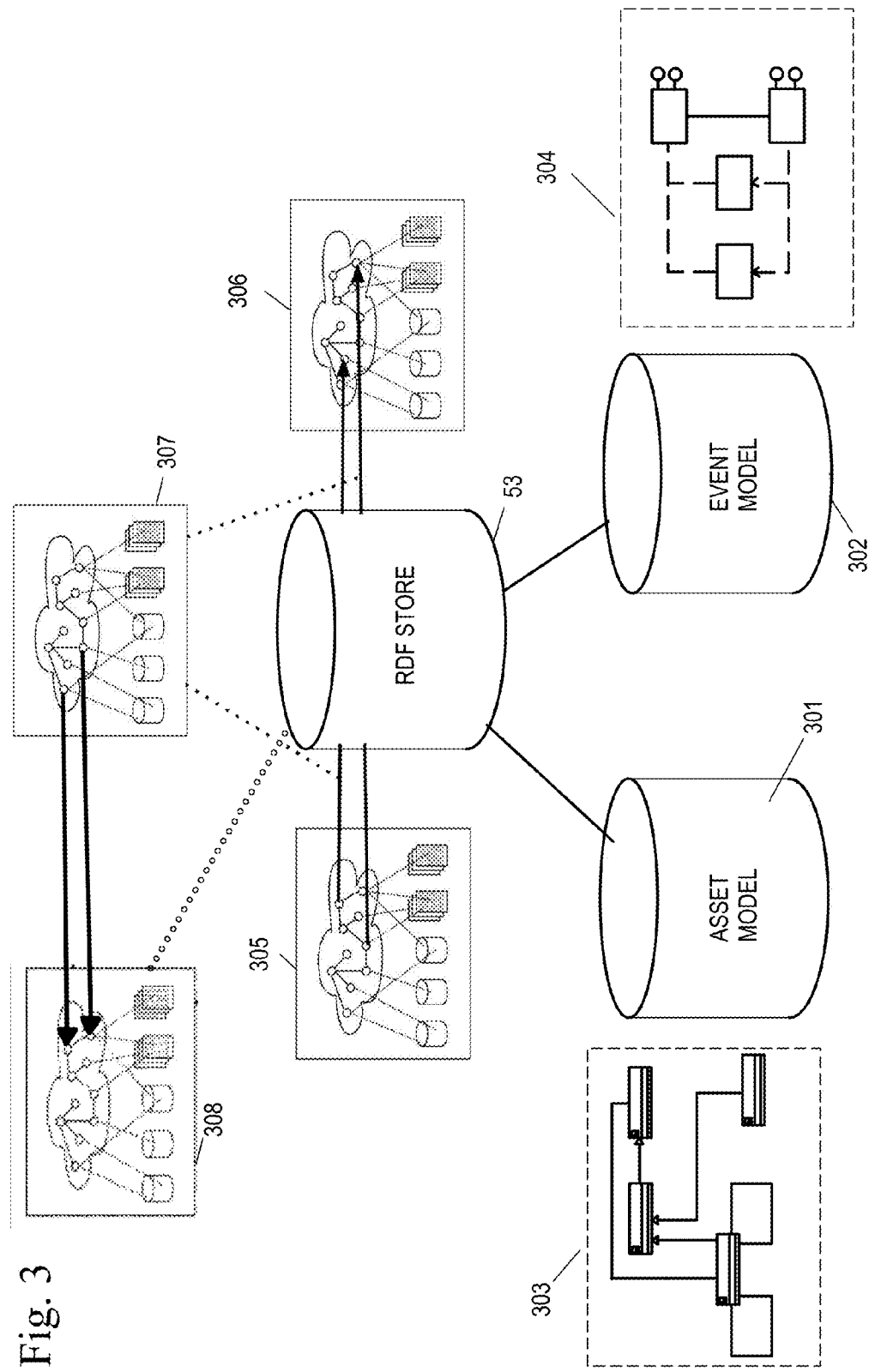
FIG. 3 shows an example of a possible relationship between a topic map meta-model that identifies assets, a topic map meta-model that identifies events, a topic meta-model that represents the semantic mapping of assets to events, and a topic map meta-model that identifies a state of an asset in various scopes.

Topic map generator program 67 creates a topic map meta-model, including a topic map based index and instance ontology, of a meta-model identifying assets and stores the created topic map meta-model identifying assets in a repository (step 201). The repository may be repository 301 as shown in FIG. 3. It should be noted that while separate repositories 301, 302 for the different meta-models are shown in FIG. 3, one repository may be used. The topic map meta-model identifying assets includes associations between assets.

Topic map generator program 67 creates a topic map meta-model, including a topic map based index and instance ontology, for a meta-model identifying events types and stores the created topic map meta-model identifying events types in a repository (step 202). The repository may be repository 302 as shown in FIG. 3. The topic map meta-model identifying event types includes associations between events types.

Topic map generator program 67 creates a topic map meta-model that maps assets in the topic map meta-model created at step 201 to events in the topic map meta-model created at step 202 and stores the topic map meta-model that represents the semantic mapping of assets to events in a repository (step 203). The topic map meta-model that represents the semantic mapping of assets to events may be created manually or by the impact analysis compare program 66. Topic map generator program 67 can recursively recreate the topic map meta-model that represents the semantic mapping of assets to events as new event types are generated or additional assets are added. An association between an event type and at least one asset in the topic map meta-model that represents the semantic mapping of assets to events is herein referred as an "impact association", and the association indicates that an occurrence of the event type may have an impact on the at least one asset.

Topic map generator program 67 creates a topic map meta-model, including a topic map based index and instance ontology, of a meta-model identifying a state machine or operating states of an asset and stores the created topic map meta-model identifying a state machine in a repository (step 204), for example repository 53. Alternatively, the topic map meta-model may be associated with repository 301 which stores the asset model.

The state topic map meta-model is associated with at least one asset in the topic meta-model that represents the semantic mapping of assets to events (step 205).

An instance of an event is added to the topic map meta-model mapping assets to events (step 206).

Impact analysis compare program 66 runs an impact analysis on the instance of an event mapped to assets of the topic map meta-model that represents the semantic mapping of assets to events to determine what assets would be impacted by the instance of the event (step 207).

Based on the results of the impact analysis of step 207, impact analysis is run on the impacted assets to determine an operating status and state of an asset due to the instance of the event (step 208), for example by the impact analysis compare program 66.

Based on the results of the impact analysis of step 208, impact analysis is run on the impacted asset with a determined operating status and state to evaluate what actions may be taken based on the event's impact and the operated status of the asset affected (step 209) and the method ends. The results of the impact analysis may be stored in a repository 53 and may be queried.

It should be noted that while not shown, impact association between at least one asset and an event in the topic map meta-model that represents semantic mapping of assets to events may be present. The data structure may be a meta-model which is part of a topic map meta-model of identifications of impact associations between an event type and at least one asset and may include information regarding the impact association such as scope, versioning metadata, temporal metadata, directionality of an impact metadata and weights of impact metadata. By removing the metadata regarding the impact associations between an event and an asset from other topic map meta-models, and placing it in a third or other topic map meta-model, the metadata can be manipulated and queried.

FIG. 3 shows an example of a possible relationship between a topic map meta-model identifying assets 305, a topic map meta-model identifying event types 306, a topic map meta-model that represents the semantic mapping of assets to events 307, and a state topic map meta-model 308 with operating states of at least one asset in the third topic map meta-model semantically mapping assets to events.

Figure 8:
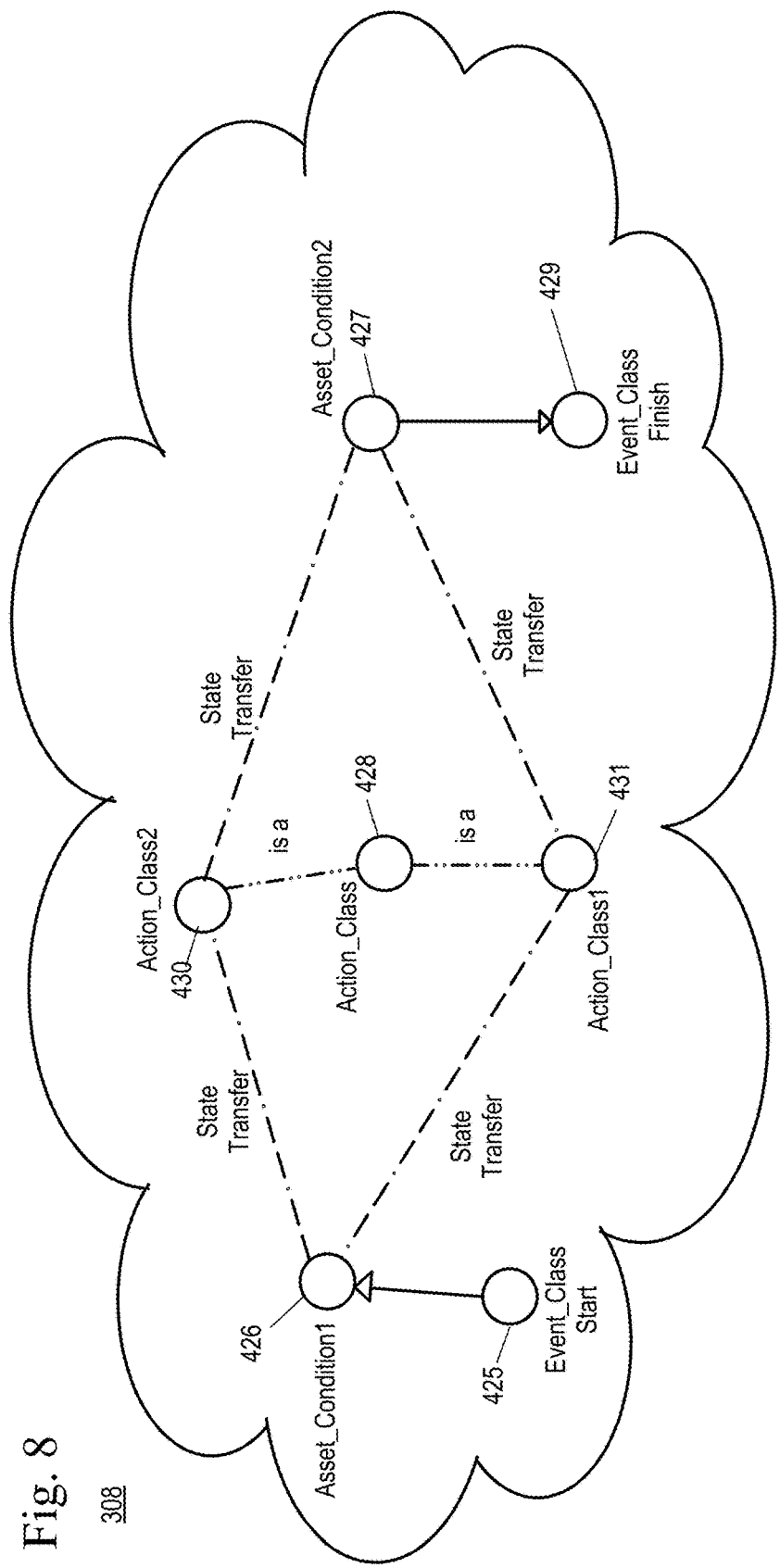
FIG. 8 shows an exemplary portion of a topic map representation of a meta-model identifying a state machine of an asset.

Stored within the resource description framework (RDF) repository, for example repository 53, are RDF triples of the assigned topics, occurrences, and attributes of the topic map meta-model that includes operating status of at least one asset 308 (shown in FIG. 8).

Stored within a resource description framework (RDF) repository, for example repository 53, are RDF triples of the assigned topics, occurrences, and attributes of the topic map meta-model that identifies assets 305. An asset meta-model 303 in which a topic map meta-model that identifies assets 305 is based may be stored within repository 53 or in a separate repository 301.

From a uniform modeling language (UML) representation 403 (shown in FIG. 4) of meta-model 303 which identifies assets, the RDF triples in Table 2 below represent an association between an Asset_WorkEquipment being connected to the other pieces of Asset_WorkEquipment. The relationship between Asset_WorkEquipment and other pieces of Asset_WorkEquipment is the type "equipment_connects". For example, Asset_WorkEquipment3 407 is connected to Asset_WorkEquipment4 406; Asset_WorkEquipment1 405 is connected to Asset_WorkEquipment2 423; Asset_WorkEquipment2 423 is connected to Asset_WorkEquipment3 407; and Asset_WorkEquipment4 406 is connected to Asset_WorkEquipment5 419. Additionally, the Asset_WorkEquipment has an Asset_Class 420. In this example, the Asset_Class may be either Asset_Class1 422 or Asset_Class2 421.

Note that for brevity in the following discussion, the following RDF namespace prefixes will be used, with (URLx) replacing an actual Uniform Resource Locator designation, or other designation of a location on a network:

TABLE 1

| Prefix | Prefix |
| --- | --- |
| rdf_syntax | http://www.w3.org/1999/02/22-rdf-syntax-ns# |
| Foo | (URL1) |
| Anne | (URL2) |

Therefore, for foo#asset_Workequipment_ EquipmentConnects_Asset_WorkEquipment, the following RDF triples would be present in the RDF repository for the association between WorkEquipment and Asset_WorkEquipment.

TABLE 2

| Subject | Predicate | Object |
| --- | --- | --- |
| foo#asset_workequipment_equipmentconnects_asset_workequipment | http://www.w3.org/1999/02/22-rdf-syntax-ns#type | anne#association |
| foo#asset_workequipment_equipmentconnects_asset_workequipment | http://www.w3.org/1999/02/22-rdf-syntax-ns#type | foo#equipment_connects |
| foo#asset_workequipment_equipmentconnects_asset_workequipment | . . . | . . . |

Stored within the resource description framework (RDF) repository, for example repository 53, are RDF triples of the assigned topics, occurrences, and attributes of topic map meta-model 306 that identifies events. An event meta-model 304 in which a topic map meta-model that identifies event types 306 is based may be stored within repository 53 or in a separate repository 302.

From a UML representation 404 (shown in FIG. 5) of a meta-model which identifies event types 304, the RDF triples in Table 3 below represent an association between a Special EventObject being a type of EventObject. The relationship between Special EventObject and EventObject is the type "is_a". Therefore, for foo#specialEventObject_is_a_EventObject, the following RDF triples would be present in the RDF repository for the association between Special EventObject and EventObject.

TABLE 3

| Subject | Predicate | Object |
| --- | --- | --- |
| foo#specialEventObject_is_a_EventObject | http://www.w3.org/1999/02/22-rdf-syntax-ns#type | anne#association |
| foo#specialEventObject_is_a_EventObject | foo#type | foo#is_a |
| foo#specialEventObject_is_a_EventObject | . . . | . . . |

Figure 4:
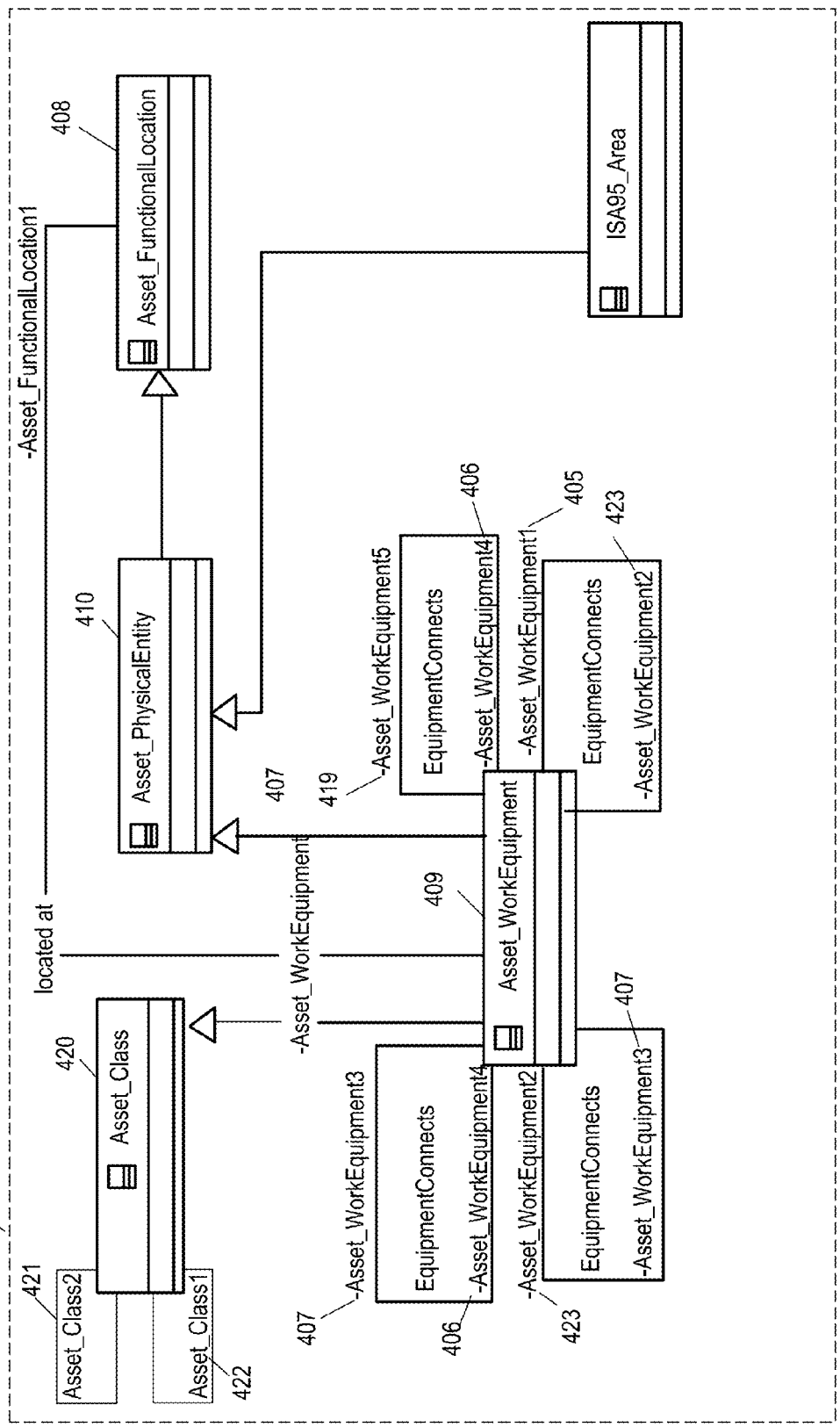
FIG. 4 shows an example of a UML representation of a meta-model identifying assets.

FIG. 4 shows an example of UML representation 403 of an asset meta-model 303 that identifies assets. Asset_WorkEquipment 409 is located at or has an occurrence at Asset_FunctionalLocation 408. Asset_WorkEquipment 409 has the attributes or plays the role of equipment and is an Asset_PhysicalEntity 410. The Asset_WorkEquipment 409 also includes Asset_Class 420. In this example, the Asset_Class may be either Asset_Class1 422 or Asset_Class2 421. The Asset_WorkEquipment 409 may either be Asset_Class1 422 or Asset_Class2 421.

The Asset_WorkEquipment 409 has Asset_WorkEquipment3 407, Asset_WorkEquipment4 406, Asset_WorkEquipment2 423, Asset_WorkEquipment5 419, and Asset_WorkEquipment1 405. While not shown, the Asset_WorkEquipment 409 may also contain other Asset_WorkEquipment.

Asset_WorkEquipment3 407 is connected to Asset_WorkEquipment4 406; Asset_WorkEquipment1 405 is connected to Asset_WorkEquipment2 423; Asset_WorkEquipment2 423 is connected to Asset_WorkEquipment3 407; and Asset_WorkEquipment4 406 is connected to Asset_WorkEquipment5 419.

ISA95_Area, which is shown in FIG. 4, is not shown in FIG. 8 in order to focus on the relationships that will occur in the topic map meta-model that represents semantic mapping of assets to events.

Figure 5:
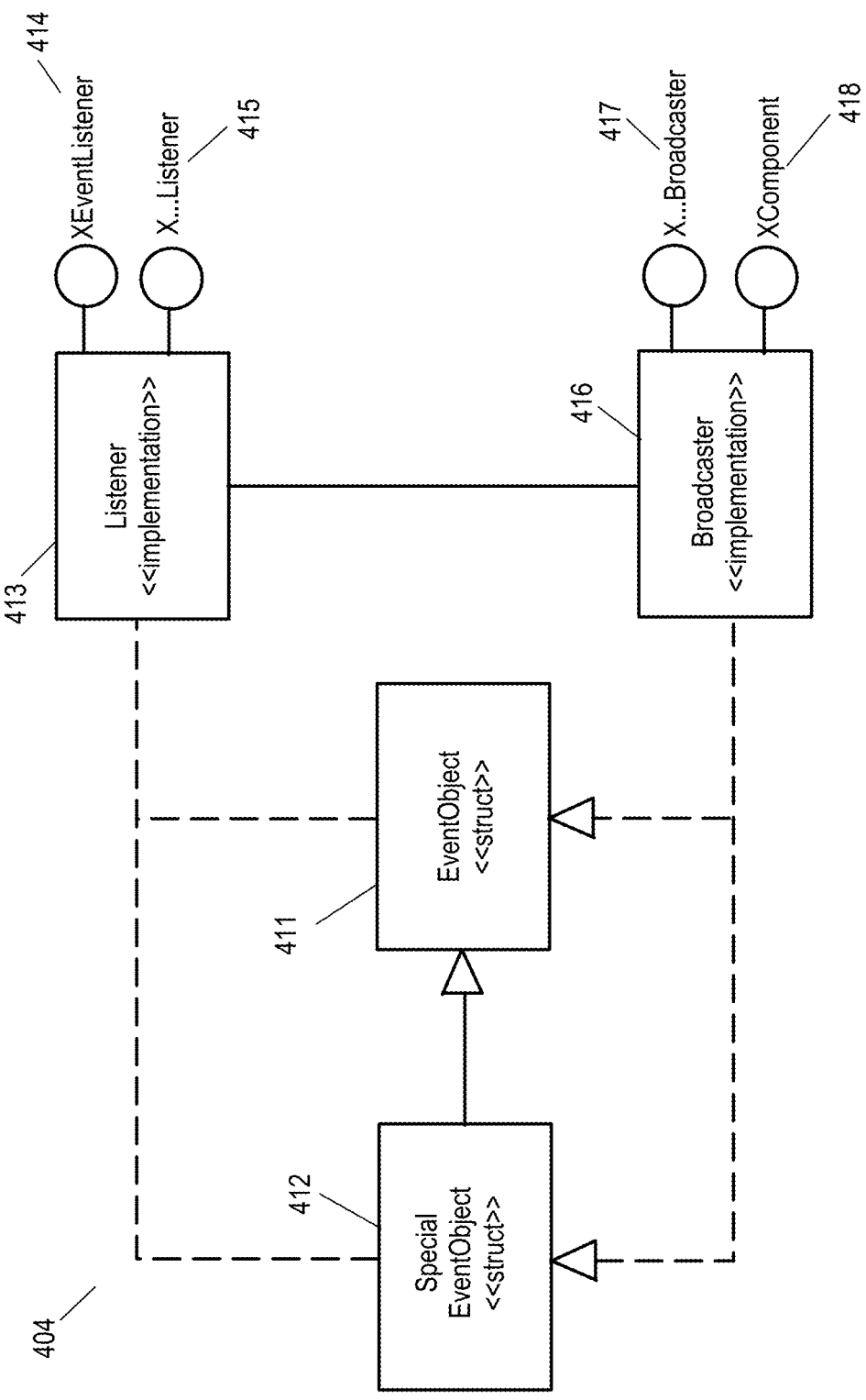
FIG. 5 shows an example of a UML representation of a meta-model identifying events.

FIG. 5 shows an example of a UML representation 404 of an event meta-model 304. A Broadcaster 416, which is an implementation of an event source and includes for example, X . . . Broadcaster 417 and XComponent 418, broadcasts events based on an EventListenerList to a Listener 413 (as shown by a solid line). It should be noted that for this application, the term "event" is defined as any predetermined occurrence that the event source considered significant enough to tell other objects about.

Listener 413 has event listeners, for example XEventListener 414 and X . . . Listener 415, which each receive information regarding event objects. An event object, for example EventObject 411 or Special EventObject 412, is an object that describes the nature of an event and stores properties and information regarding the event.

Broadcaster 416 is associated with EventObject 411 and Special EventObject 412 as shown by the dashed open arrowed lines. Special EventObject 412 is a type of EventObject 411 as indicated by the solid line and open arrow.

Figure 6:
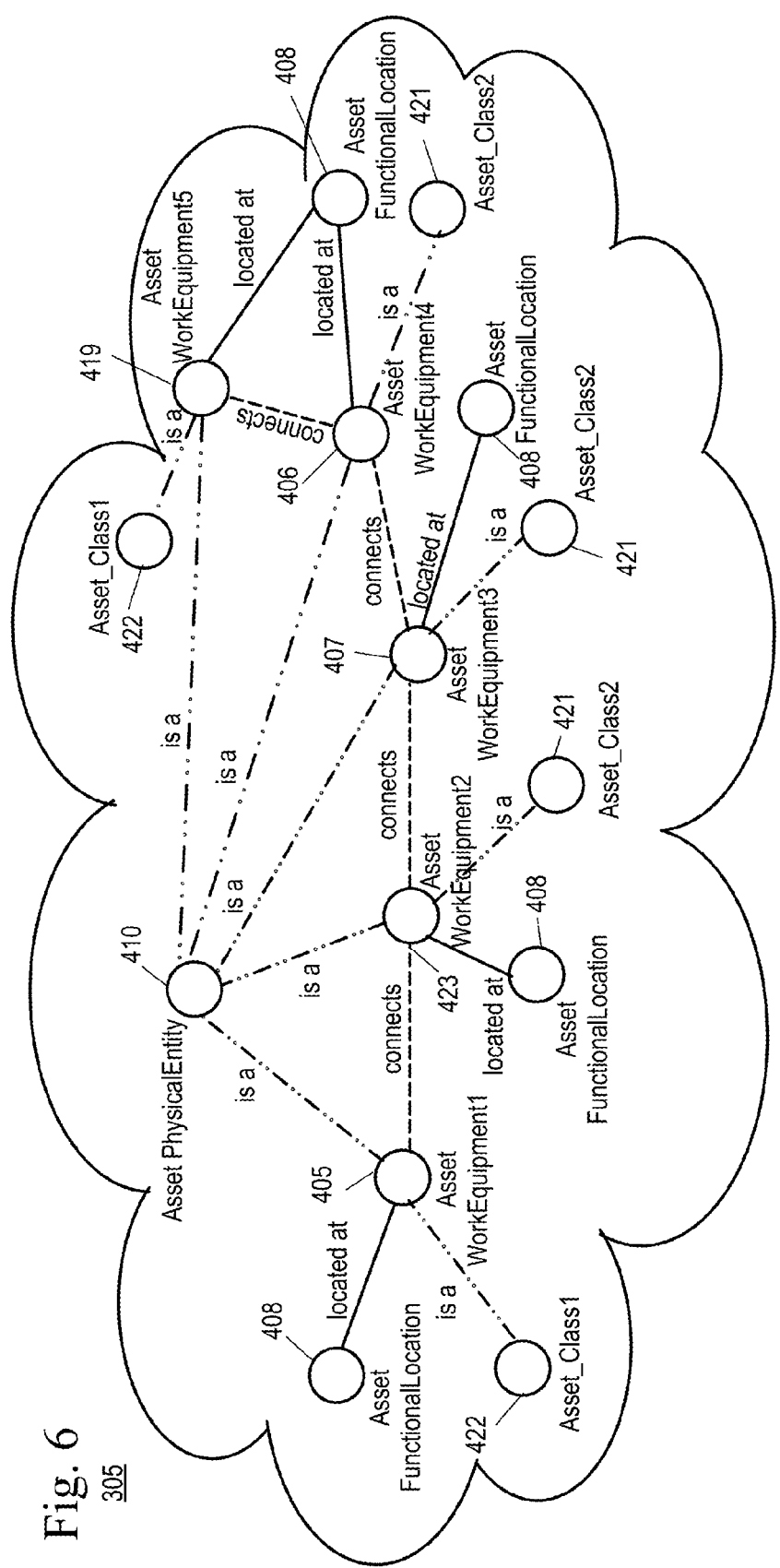
FIG. 6 shows an example of a portion of a topic map representation of a meta-model identifying assets.

FIG. 6 shows an example of a portion of a topic map representation 305 of meta-model 303. In FIG. 6, the portion of the topic map representation 305 of meta-model 303 shows only the relationship between associated Asset_WorkEquipment 405, 406, 407, 419, 423 of Asset_WorkEquipment 409 and Asset_FunctionalLocation 408, between Asset_WorkEquipment 409 and Asset_PhysicalEntity 410, and between Asset_WorkEquipment 409 and Asset_Class 420.

In the portion of the topic map representation 305 shown in FIG. 6, the topic of Asset_WorkEquipment1 405, the topic of Asset_WorkEquipment2 423, the topic of Asset_WorkEquipment3 407, the topic of Asset_WorkEquipment4 406, and the topic of Asset_WorkEquipment5 419 are located at or have occurrences at Asset_FunctionalLocation 408 (shown by a solid line). The topic of Asset_WorkEquipment1 405, the topic of Asset_WorkEquipment2 423, the topic of Asset_WorkEquipment3 407, the topic of Asset_WorkEquipment4 406, and the topic of Asset_WorkEquipment5 419 have the attributes or play the role of equipment and are Asset_PhysicalEntity 410 (shown by a dash-dot-dot line). The topic Asset_FunctionalLocation 408 has the attributes or plays the role of location. The topic of Asset_WorkEquipment1 405 is connected (shown by the dashed line) to the topic of Asset_WorkEquipment2 423. The topic of Asset_WorkEquipment2 423 is connected to the topic of Asset_WorkEquipment3 407. The topic of Asset_WorkEquipment3 407 is connected to the topic of Asset_WorkEquipment4 406. The topic of Asset_WorkEquipment4 406 is connected to the topic of Asset_WorkEquipment5 419. The topic of Asset_WorkEquipment1 and the topic of Asset_WorkEquipment5 419 (shown by a dash-dot-dot line) are of Asset_Class1 422. The topics of Asset_WorkEquipment2 423, Asset_WorkEquipment3 407, Asset_WorkEquipment4 406 are of Asset_Class2 421 (shown by a dash-dot-dot line).

Figure 7:
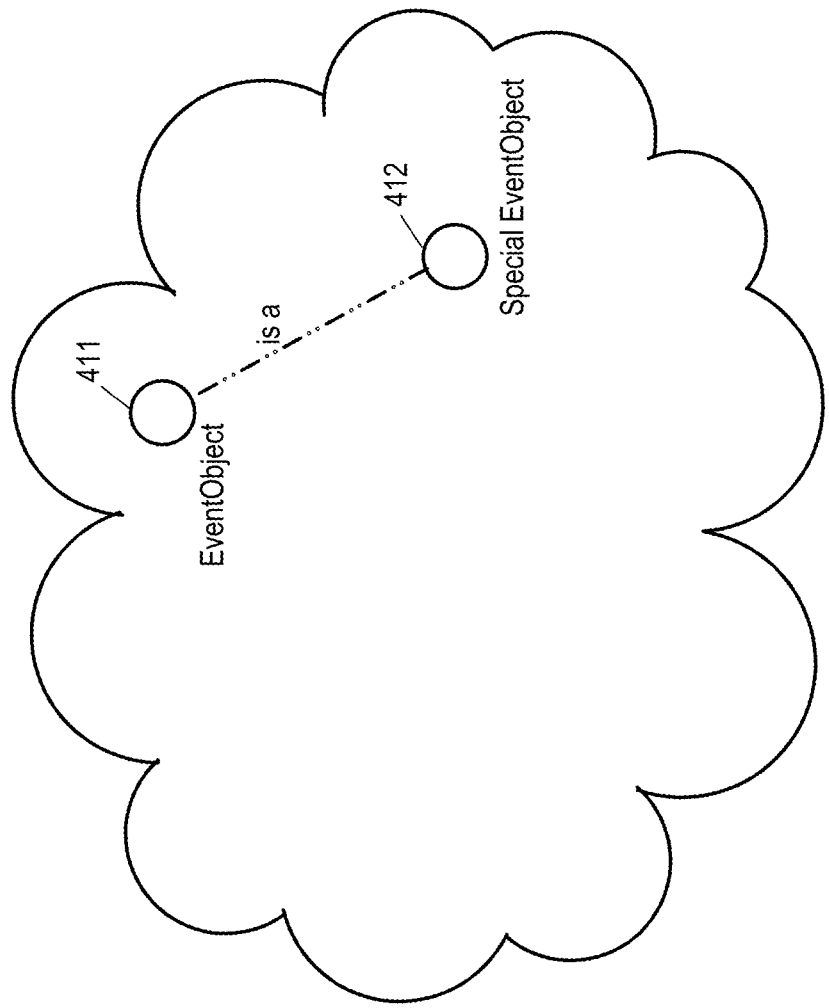
FIG. 7 shows an example of a portion of a topic map representation of a meta-model identifying events.

FIG. 7 shows an example of a portion of a topic map representation 306 of meta-model 304. In the portion of the topic map representation 306 shown in FIG. 7, the topic of Special EventObject 412 is an Event Object 411 (shown by the dash-dot-dot line). The topics of Listener and Broadcaster shown in FIG. 5 are not shown in FIG. 7 in order to focus the relationships that will occur in the topic map meta-model that represents the semantic mapping of assets to events 307.

FIG. 8 shows an exemplary portion of a topic map representation of a meta-model identifying a state machine of an asset. A state topic map meta-model preferably includes an event topic, an action topic, and a condition topic. The associations between the topics may be an event role, event target role, input event role, condition role and action role. An event role is used in a state topic map meta-model and indicates an event start node. An event target role is also used in a state topic map meta-model and indicates an event end node. An input event role connects an incoming event to an asset and indicates that an event is occurring to a specific asset.

The topic of Event_Class Start 425 is an event role (indicated by the arrow) to the topic of Asset_Condition1 426. The Asset_Condition1 426 has a state transfer or condition role of Action_Class2 430 and of Action_Class1 422 (indicated by dash-dash-dot line). The topic of Asset_Condition2 427 has a state transfer or condition role of Action_Class2 430 and of Action_Class1 431 (indicated by dash-dash-dot line). The topic of Event_Class Finish 429 is an event target role (indicated by the arrow).

The topic of Action_Class1 431 is an Action_Class 428 and the topic of Action_Class2 430 is also an Action_Class 428 (indicated by dash-dot-dot line). While an "is a" role is shown in FIG. 8 between the topics of Action_Class2 430, Action_Class 428, and Action_Class1 431, it should be noted that the role of Action_Class2 430 is an action role.

While only a few conditions and actions were shown, each asset may include a topic map meta-model which includes all states of an asset and under what conditions that asset may be present in those states, as well as actions that can be taken to alter the state of the asset relative to an event.

Figure 9:
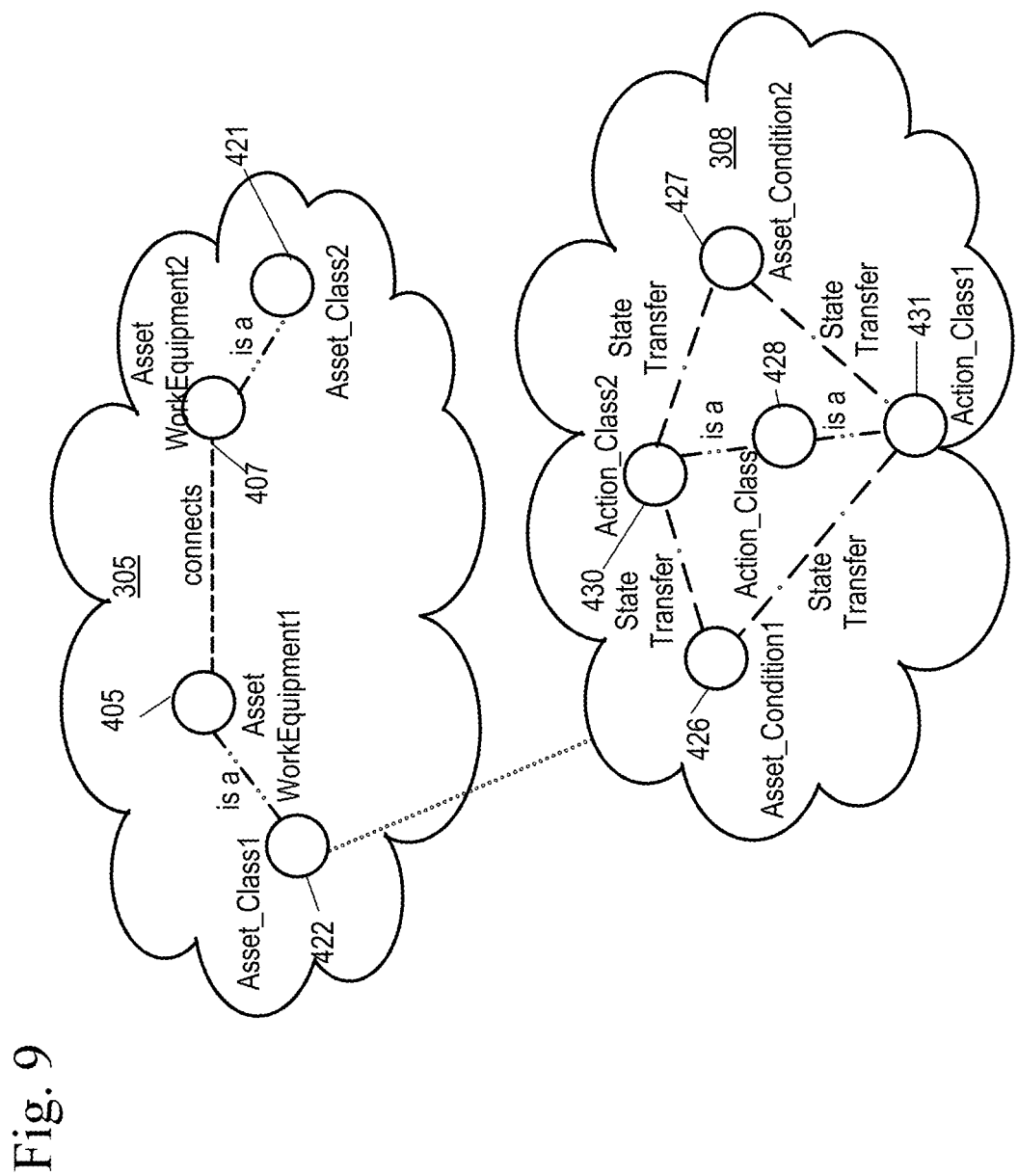
FIG. 9 shows an exemplary portion of a topic map representation of a meta-model identifying mapping of a state machine to a topic map representation of a meta-model identifying assets.

FIG. 9 shows an exemplary portion of a topic map representation of a meta-model identifying mapping of a state machine to a topic map representation of a meta-model identifying assets. In this Figure, the topic of Asset_WorkEquipment1 405 is an Asset_Class1 422 in the topic map meta-model mapping assets. The topic of Asset_Class1 422 is mapped to an exemplary portion of a meta-model identifying a state machine of Asset_Class1 422, including the states of the asset and actions of the asset to alter the condition or state of the asset. The mapping of the topic map representation of a meta-model identifying a state machine to a topic map representation of a meta-model identifying assets is indicated in the figure by a dotted line.

Figure 10:
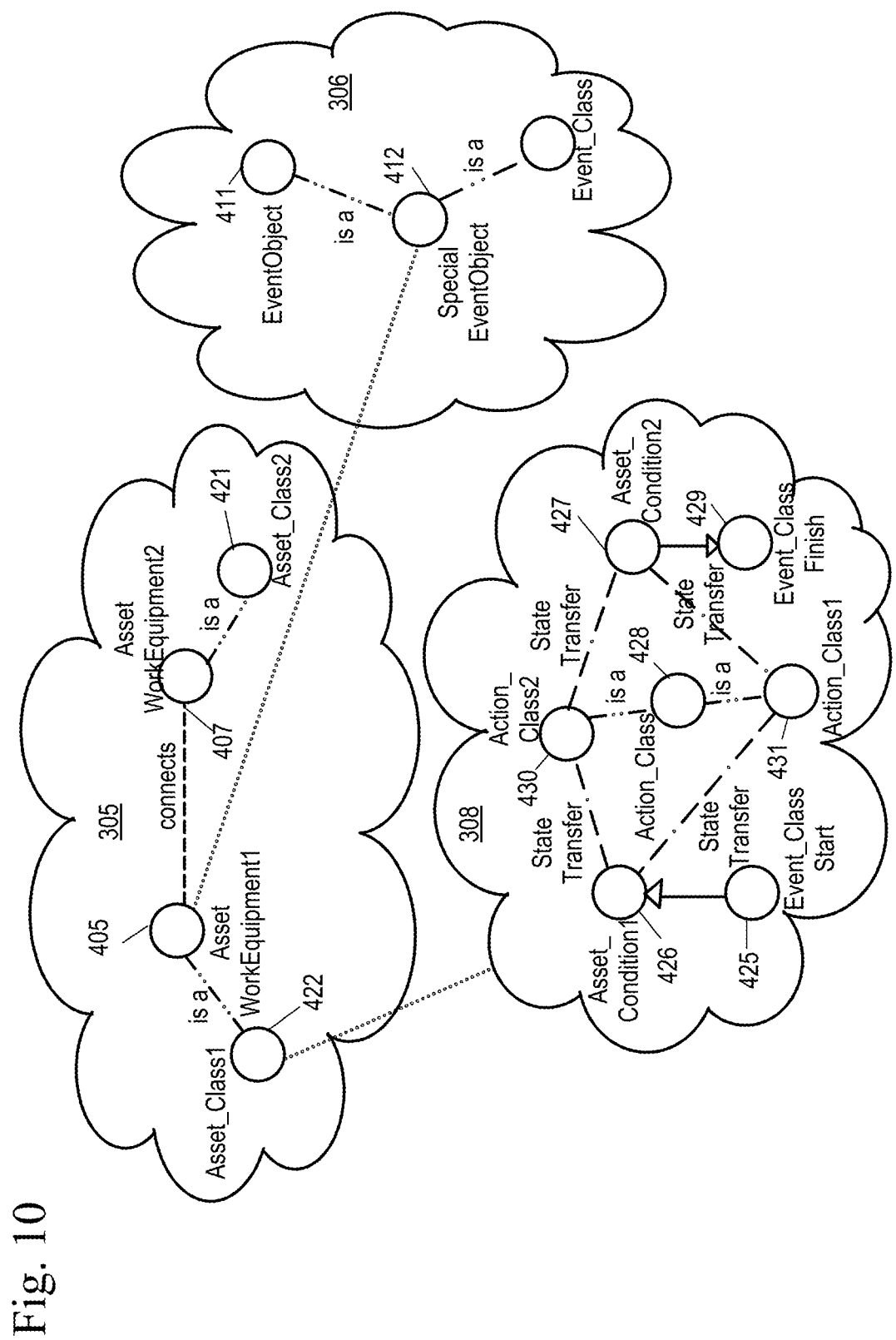
FIG. 10 shows an exemplary portion of a topic map representation of a meta-model identifying mapping of assets to events and an exemplary portion of a topic map representation of a meta-model identifying mapping of a state machine.

FIG. 10 shows an exemplary portion of a topic map representation of a meta-model identifying mapping of assets to events and an exemplary portion of a topic map representation of a meta-model identifying mapping of a state machine.

The dotted line shows a topic of an event, Special EventObject 412, of a topic map representation of a meta-model identifying events connected to a topic of an asset, Asset_WorkEquipment1 405, of a topic map representation of a meta-model identifying assets. The Special EventObject 412 is an input event role of Asset_WorkEquipment1 405. A dotted line is also present between a topic of an asset, Asset_WorkEquipment1 405, of a topic map representation of a meta-model identifying assets and a topic map representation of a meta-model identifying states of the asset. By mapping an event to assets with a state machine or operating state of the asset, impact analysis of the event on a state of the asset may be determined.

Figure 11:
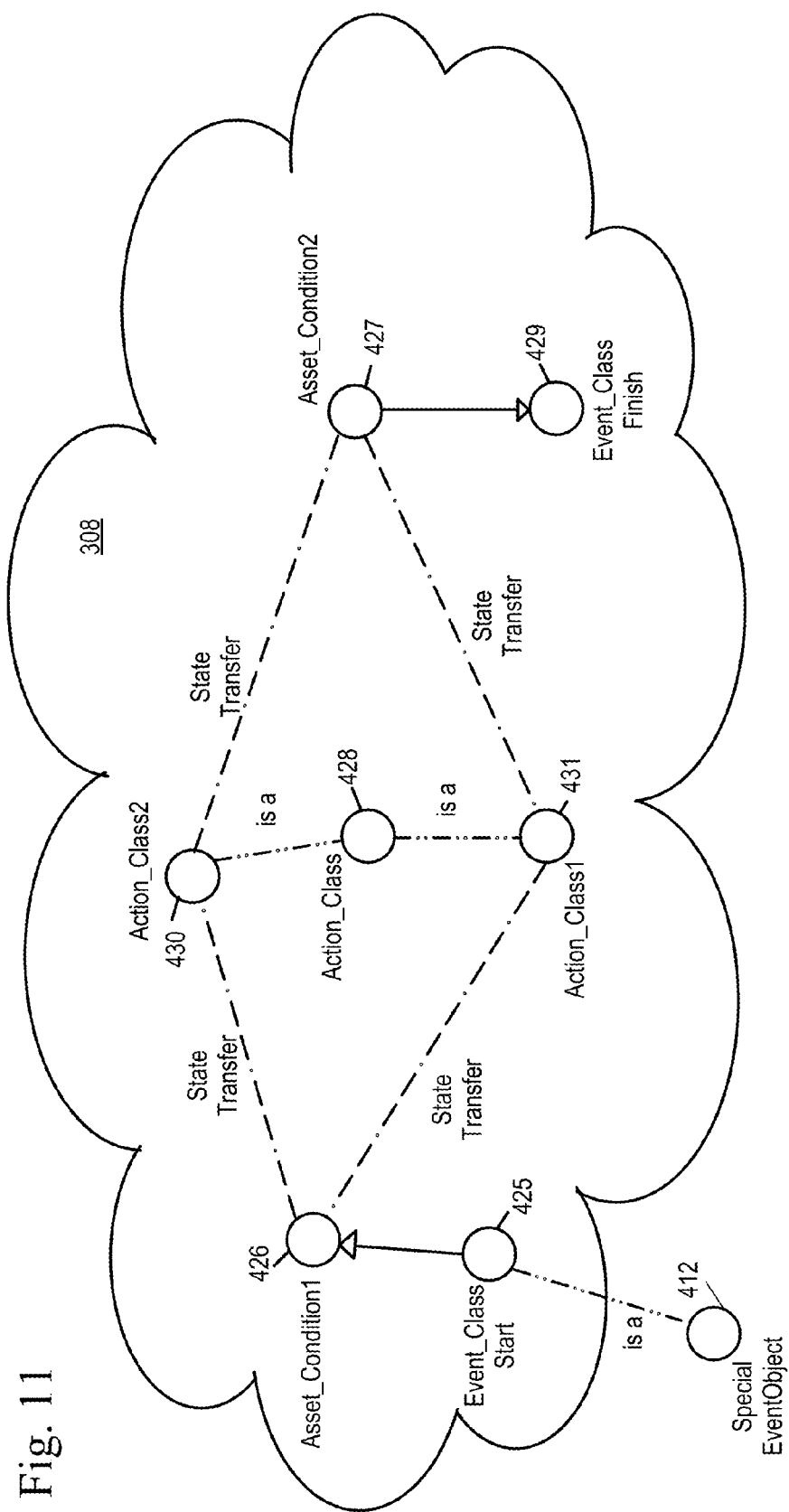
FIG. 11 shows an exemplary portion of a topic map representation of an event mapped to a portion of a topic map representation of a meta-model identifying a state machine.

FIG. 11 shows an exemplary portion of a topic map representation of an event mapped to a portion of a topic map representation of a meta-model identifying a state machine. Based on impact analysis, discussed in further detail below, an event of the topic map representation of an event is an event which may alter the condition of the asset. More specifically, the Special EventObject 412 has an impact on the condition of Asset_WorkEquipment1 405 and may alter the state of the asset.

Figure 12:
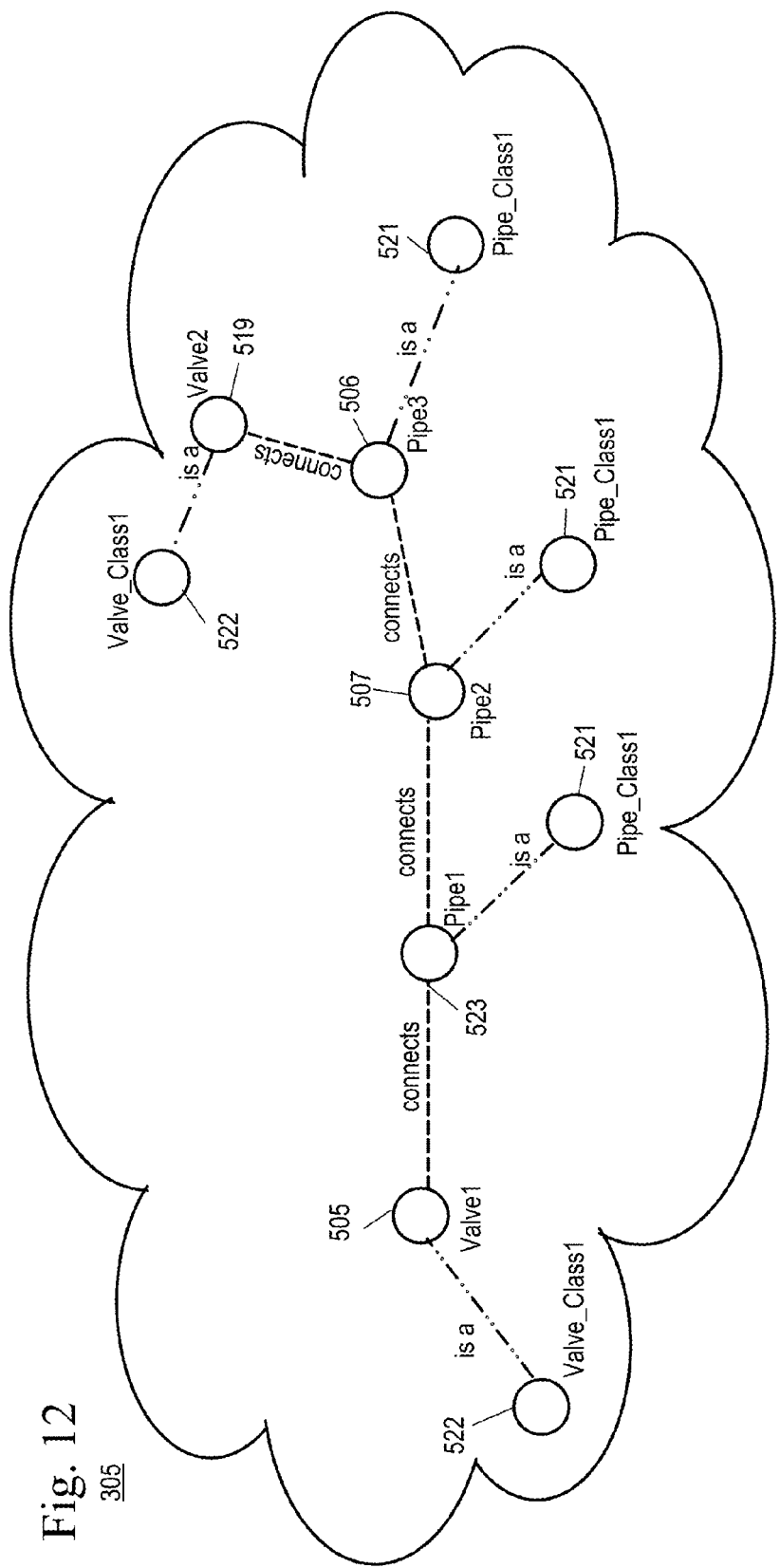
FIG. 12 shows an exemplary portion of a topic map representation of a meta-model representing a valve system.

FIG. 12 shows an exemplary portion of a topic map representation of a meta-model representing a valve system. In this example, Valve1 505 is connected to a Pipe1 523. Pipe1 523 is connected to Pipe2 507. Pipe2 507 is connected to Pipe3 506. Pipe3 506 is connected to Valve2 519. Valve1 505 and Valve2 519 are Valve_Class1 522. Pipe1 523, Pipe2 507, and Pipe3 506 are Pipe_Class 1 521.

Figure 13:
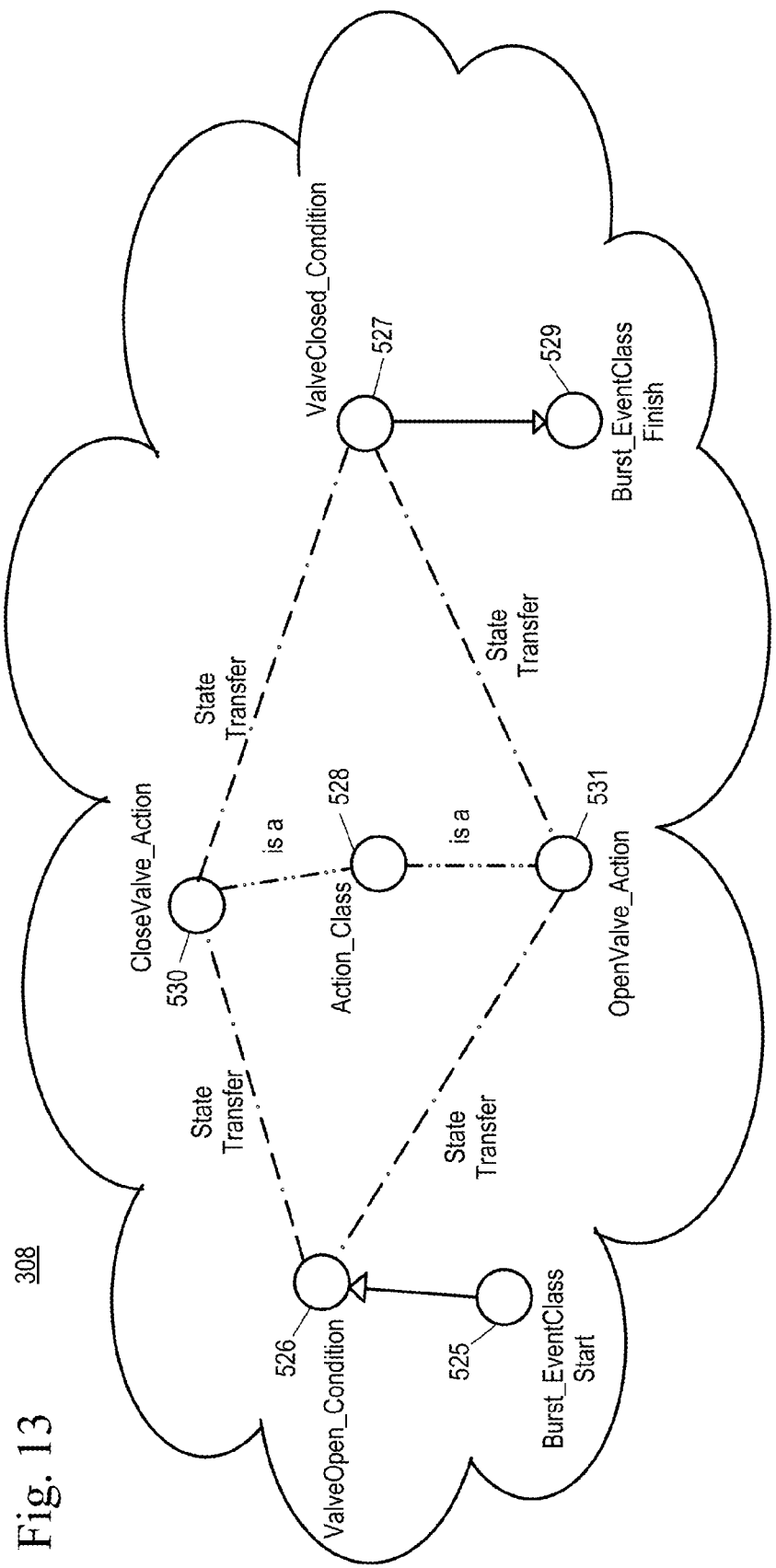
FIG. 13 shows an exemplary portion of a topic map representation of a meta-model representing a state machine of a valve of the valve system.

FIG. 13 shows an exemplary portion of a topic map representation of a meta-model representing a state machine of a valve of the valve system. In this example, the Valve1 505 and Valve2 519 have a ValveOpen_Condition 526 and a ValveClosed_Condition 527. In order for Valve1 505 or Valve2 519 to move from the ValveOpen_Condition 526 to the ValveClosed_Condition 527, the valves undergo a state transfer and a CloseValve_Action 530. In order for Valve1 505 or Valve2 519 to move from the ValveOpen_Condition 527 to the ValveClosed_Condition 527, the valves undergo a state transfer and a OpenValve_Action 531. If a Burst-Event1 occurs when a valve is open, the Burst_EventClass Start 525 starts with the ValveOpen_Condition 526. Similarly, when the BurstEvent1 is completed, after the valve condition has been moved to a closed position, the Burst_EventClass Finish 529.

Figure 14:
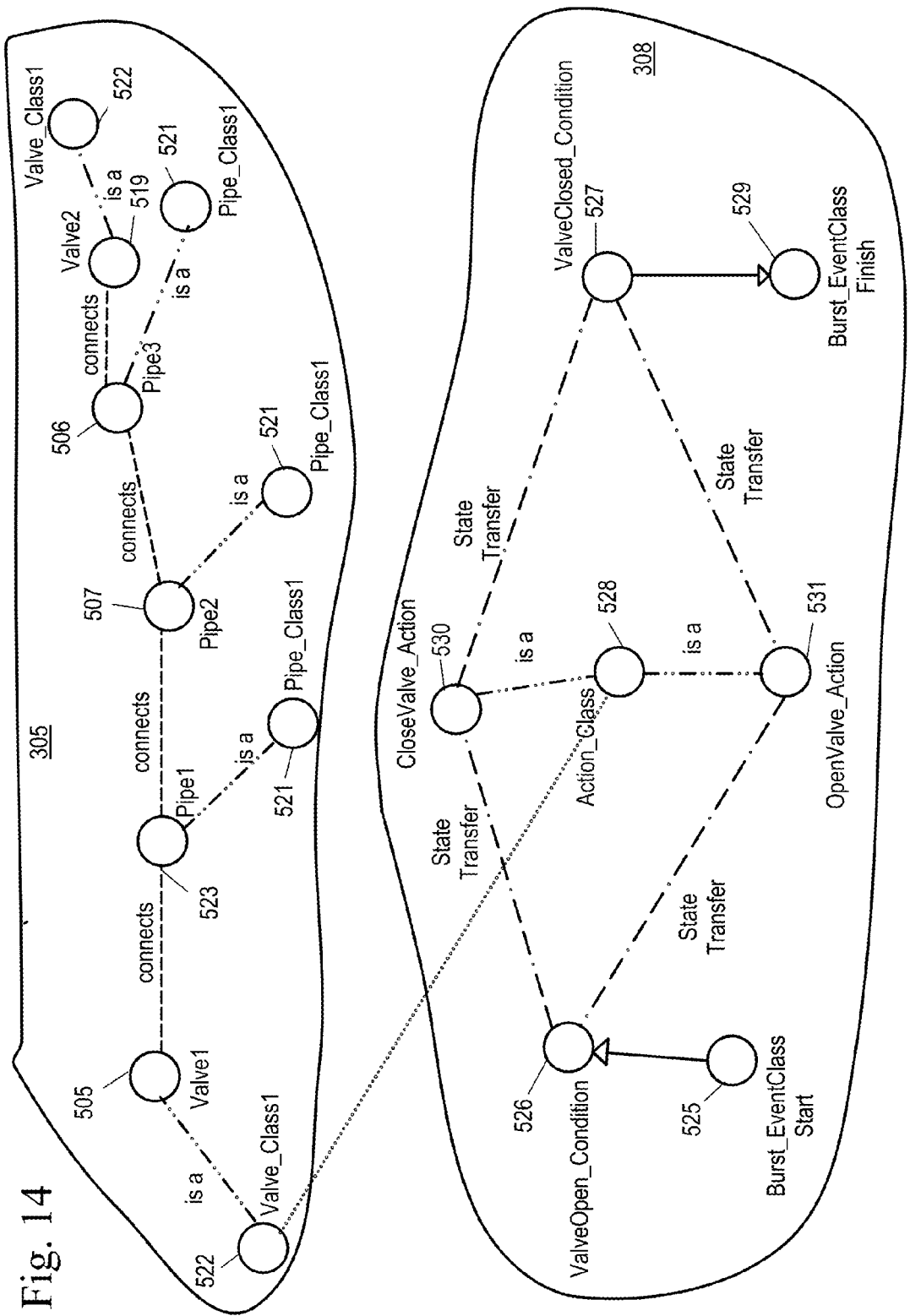
FIG. 14 shows an exemplary portion of a topic map representation of a meta-model representing a valve system with at least one valve being mapped to an exemplary portion of a topic map representation of a meta-model representing a state machine of the valve.
Figure 15:
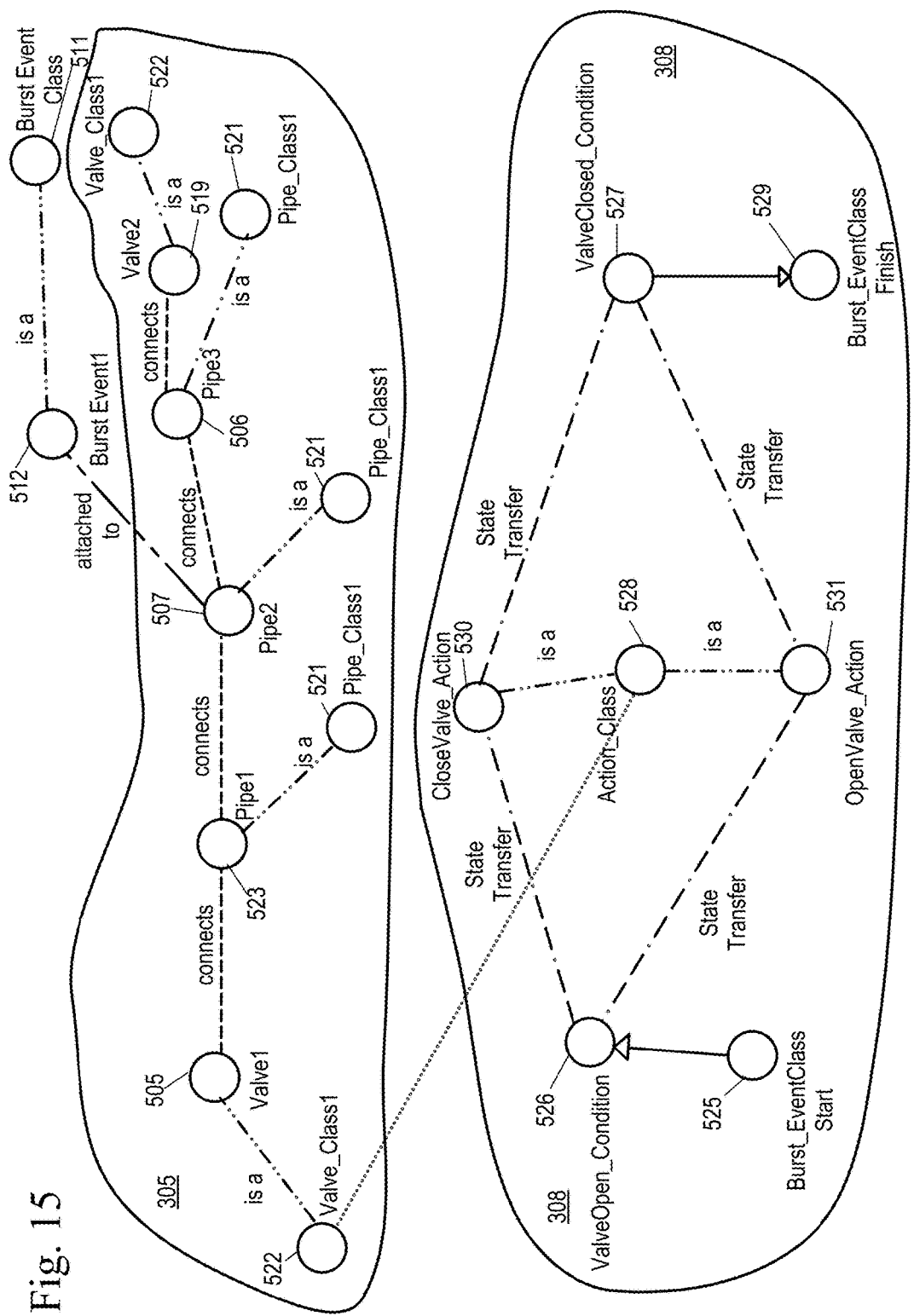
FIG. 15 shows an exemplary portion of a topic map representation of a meta-model representing a valve system with at least one valve being mapped to an exemplary portion of a topic map representation of a meta-model representing a state machine of the valve and an exemplary portion or a topic map representation of an event impacting the at least one valve.

FIG. 14 shows an exemplary portion of a topic map representation of a meta-model representing a valve system with at least one valve being mapped to an exemplary portion of a topic map representation of a meta-model representing a state machine of the valve. FIG. 15 shows an exemplary portion of a topic map representation of a meta-model representing a valve system with at least one valve being mapped to an exemplary portion of a topic map representation of a meta-model representing a state machine of the valve and an exemplary portion or a topic map representation of an event impacting the at least one valve. An instance of a Burst_Event1 512 is attached to Pipe2 507. The Burst_Event1 512 is a Burst_EventClass 511. The BurstEvent1 attached to Pipe2 may be an event in which the Pipe2 has burst.

Figure 16:
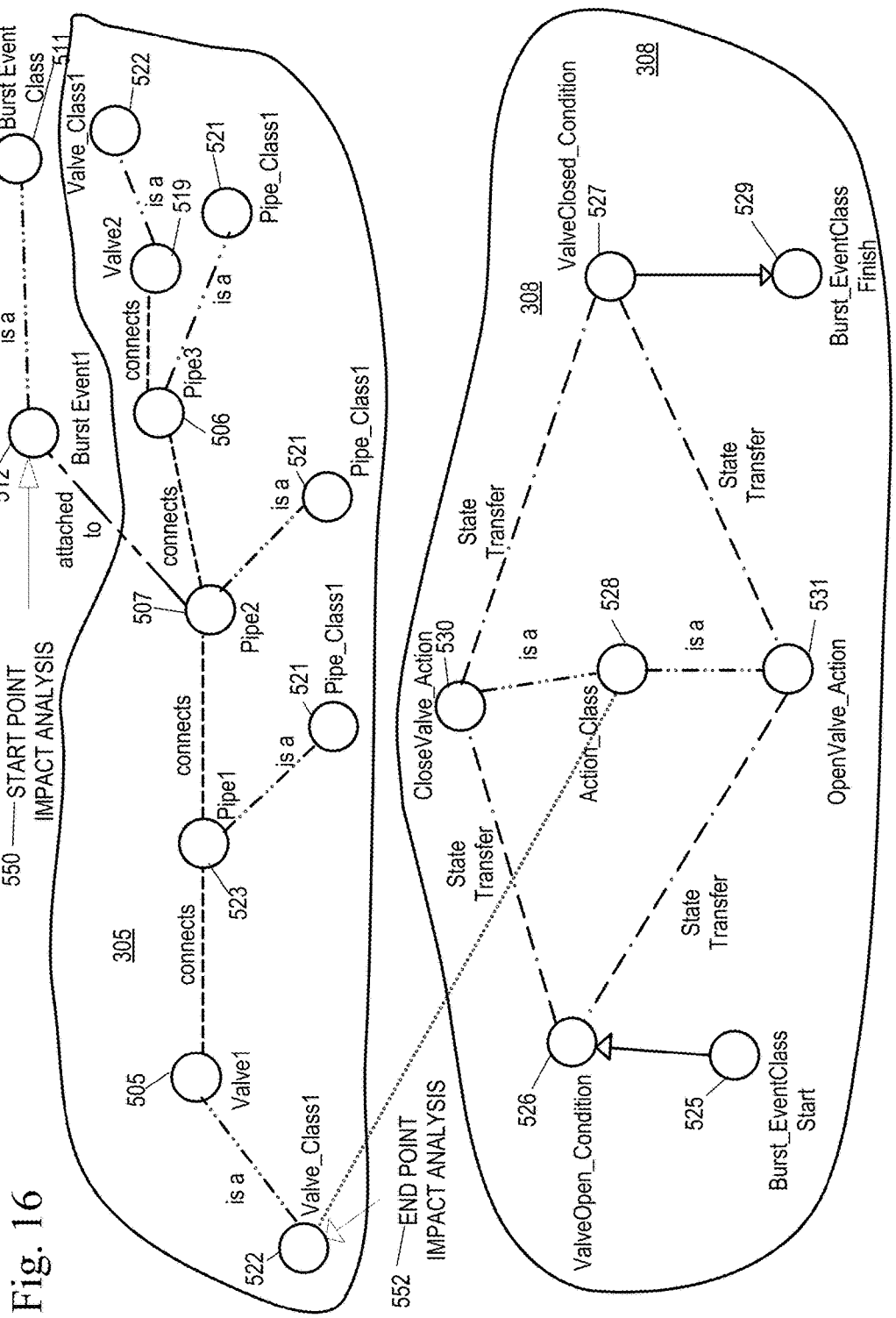
FIG. 16 shows a starting point of impact analysis of an exemplary portion of a topic map representation of a meta-model representing a valve system with at least one valve being mapped to an exemplary portion of a topic map representation of a meta-model representing a state machine of the valve and an exemplary portion or a topic map representation of an event impacting the at least one valve.

FIG. 16 shows a starting point of impact analysis of an exemplary portion of a topic map representation of a meta-model representing a valve system with at least one valve being mapped to an exemplary portion of a topic map representation of a meta-model representing a state machine of the valve and an exemplary portion or a topic map representation of an event impacting the at least one valve. A Burst_Event denotes the occurrence of a burst (failure) in a pipe, which might be controlled by or connected to one or more valves. One or more of the valves may be opened or closed to deal with the Burst_Event.

Impact analysis may be run to determine what action needs to take place when an event happens. The impact analysis determines what events have an impact on what asset by the impact associations present in the topic map meta-models. The start point of impact analysis 550 starts at the instance of Burst_Event1 512. Based on the relationships represented by the topic map meta-model, the impact analysis determines that the Burst_Event1 512 attached to the Pipe2 507 has an impact on Valve1 505 or Valve2 519 which are of a Valve_Class1 522. The end point of the impact analysis 552 is the Valve_Class 1 522.

Figure 17:
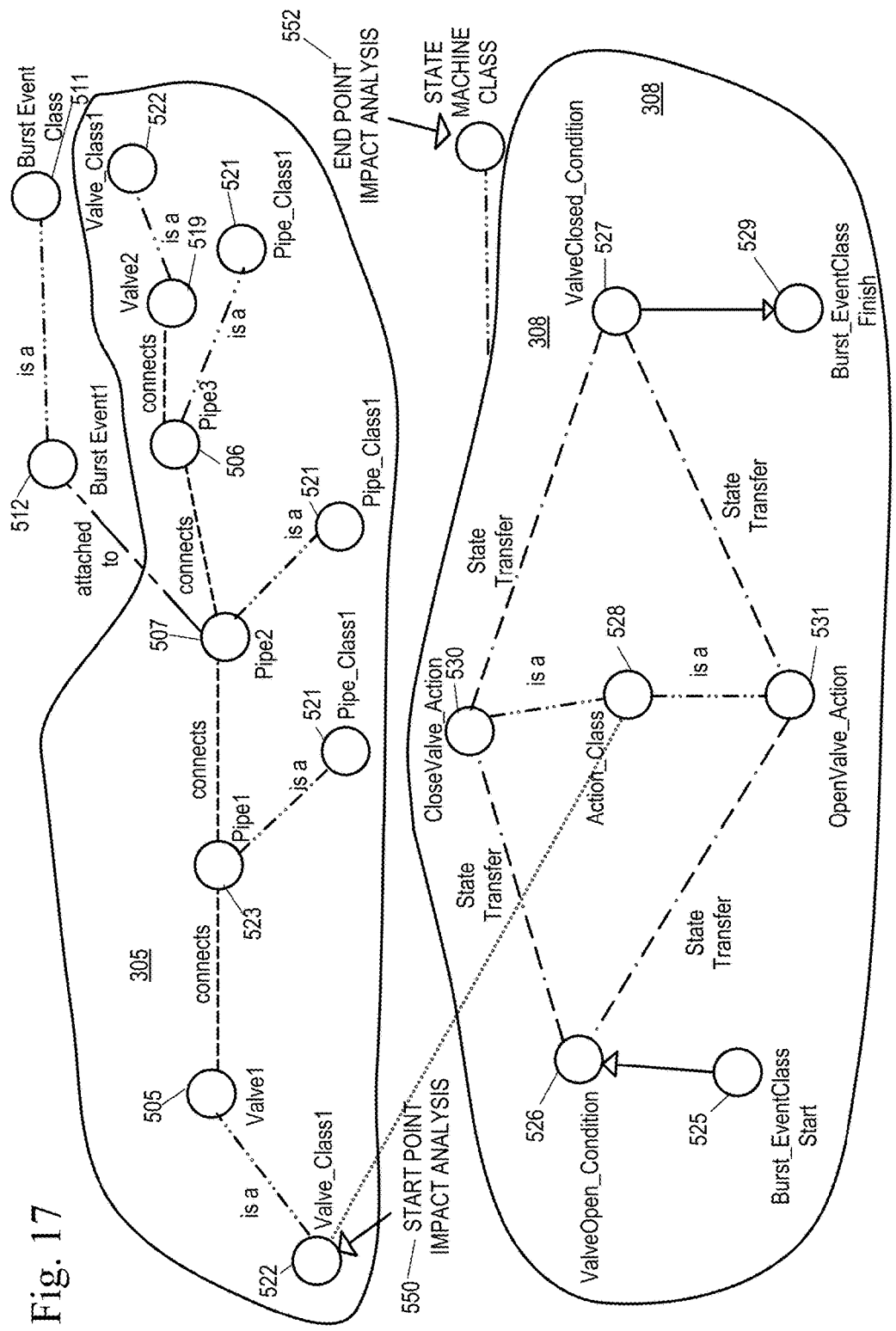
FIG. 17 shows a starting point of an impact analysis of an exemplary portion of a topic map meta-model representing a state machine.
Figure 18:
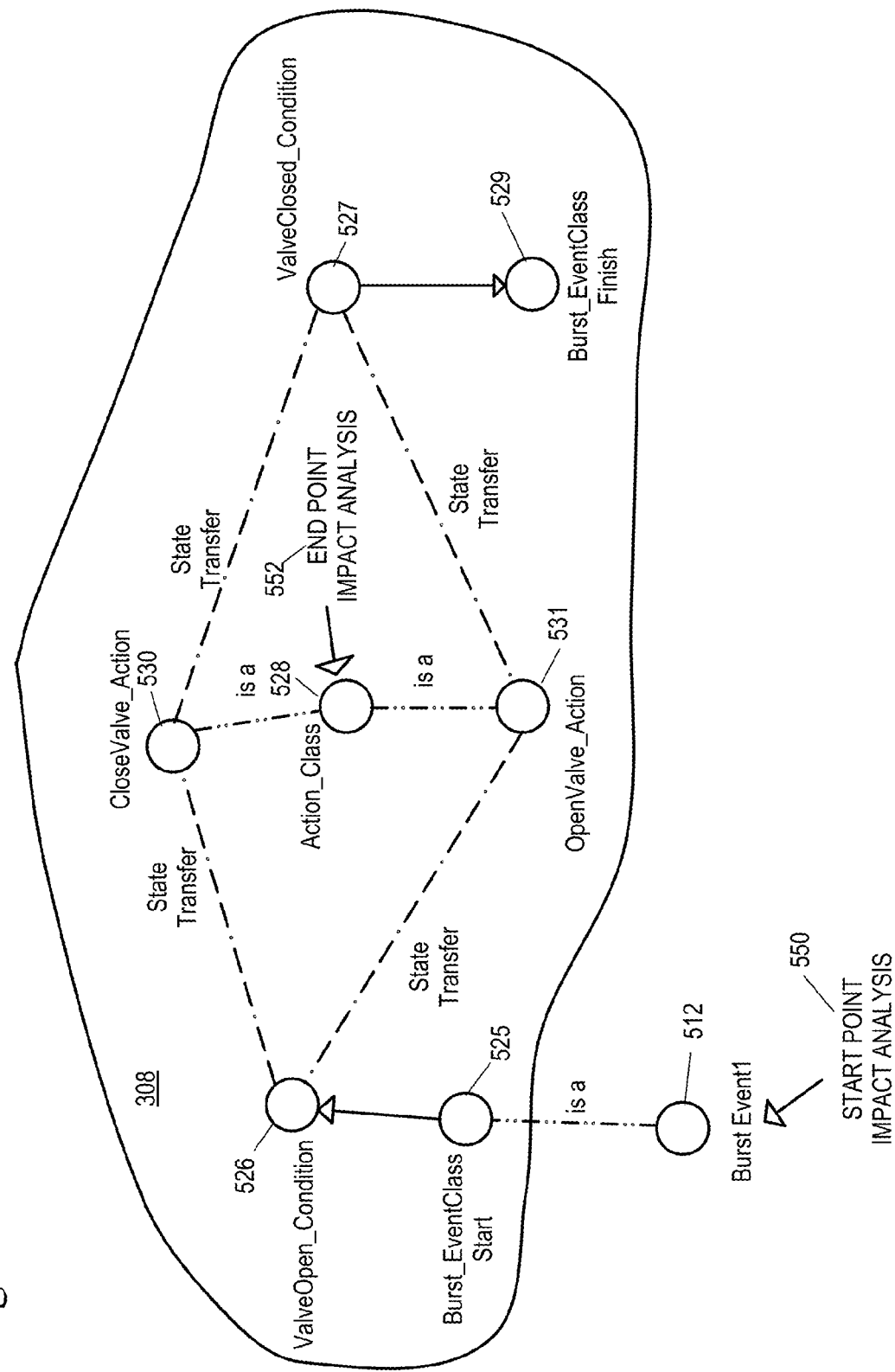
FIG. 18 shows another example of an impact analysis.

Impact analysis is then run again starting with Valve_Class1 as the start point of the impact analysis 550 as shown in FIG. 17. Running impact analysis is run for each impacted Valve, in this instance Valve1 505 and Valve2 519. The impact analysis determines that the Valve1 has a state machine based on the association between the asset and its associated class and the state topic map meta-model 308.

After the impact analysis determines that the Valve1 and Valve2 have a state machine, the impact analysis begins at the Burst_EventClass Start 525. Since the Burst_Event1 512 is a Burst_Event, the impact analysis begins at the Burst_EventClass Start 525. Based on the condition of Valve1 505, which in this example is open, the action needed to be taken is to close the valve (CloseValve_Action 530) to remove the impact. The end of the impact analysis is at the Action_Class 528. The impact analysis would be rerun for Valve2 519.

FIG. 19 illustrates internal and external components of client computer 52 and server computer 54 in which illustrative embodiments may be implemented. In FIG. 19, client computer 52 and server computer 54 include respective sets of internal components 800*a*, 800*b*, and external components 900*a*, 900*b*. Each of the sets of internal components 800*a*, 800*b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, topic map generator program 67 and impact analysis compare program 66 are stored on at least one of one or more of the computer-readable tangible storage devices 830 for execution by at least one of one or more of the processors 820 via at least one of one or more of the RAMs 822 (which typically include cache memory). In the embodiment illustrated in FIG. 19, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a*, 800*b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. Topic map generator program 67 and impact analysis compare program 66 can be stored on at least one of one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Topic map generator program 67 and impact analysis compare program 66 can be downloaded to client computer 52 and server computer 54 from an external computer via a network (for example, the Internet, a local area network or other, wide area network) and network adapter or interface 836. From the network adapter or interface 836, topic map generator program 67 and impact analysis compare program 66 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Topic map generator program 67 and impact analysis compare program 66 can be written in various programming languages including low-level, high-level, object-oriented or non object-oriented languages. Alternatively, the functions of topic map generator program 67 and impact analysis compare program 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of determining an impact an event, mapped to a representation of the event and identified in a first topic map meta-model of events, will have on at least one physical asset, mapped to a representation of the at least one physical asset and identified in a second topic map meta-model of physical assets, each of the at least one physical asset having a respective state machine in a respective third topic map meta-model of the state machine, the event having a source including a broadcaster, the method comprising the steps of:

a computer creating a fourth topic map meta-model that identifies the at least one physical asset and events in a topic map based index with instance ontology based on the second topic map meta-model that identifies the at least one physical asset and the first topic map meta-model that identifies the event, the fourth topic map meta-model semantically mapping the at least one physical asset identified in the second topic map meta-model to the event identified in the first topic map meta-model, impact association between the at least one physical asset and the event in the fourth topic map meta-model representing the semantic mapping of the at least one physical asset to the event and including at least one from a group of a scope, versioning metadata, temporal metadata, directionality of an impact metadata and weights of impact metadata;

the computer associating the respective state machine of each of the third topic map meta-models with one or more corresponding physical assets of the at least one physical asset identified in the fourth topic map meta-model;

the computer receiving an instance of the event identified in the first topic map meta-model from the broadcaster;

the computer adding the instance of the event received from the broadcaster to the fourth topic map meta-model;

the computer running a first impact analysis on the instance of the event, received from the broadcaster and mapped to the at least one physical asset identified in the fourth topic map meta-model semantically mapping the at least one physical asset to the event, to determine which of the at least one physical asset identified in the fourth topic map meta-model were impacted by the instance of the event received from the broadcaster added to the fourth topic map meta-model;

the computer running a second impact analysis on an impacted physical asset of the at least one physical asset of the fourth topic map meta-model, determined by the first impact analysis, to determine an operating status and a state of the impacted physical asset due to the instance of the event received from the broadcaster and the state machine of the impacted physical asset; and the computer running a third impact analysis on the operating status and the state of the impacted physical asset, determined by the second impact analysis, due to the instance of the event added to the fourth topic map meta-model to determine and take at least one action to alter the state of the impacted physical asset to remove an impact on the impacted physical asset based on the first impact analysis of the instance of the event, the second impact analysis on the impacted physical asset and the third impact analysis on the operating status and the state of the impacted physical asset, using the third topic map meta-model of the state machine associated with the impacted physical asset identified in the fourth topic map meta-model, wherein as new event types are added and as new physical assets are added, the computer generates a new fourth topic map meta-model to semantically map physical assets to events.

2. The method of claim 1, wherein the instance of the event received from the broadcaster comprises at least one failure event for at least one of the at least one physical asset.

3. The method of claim 2, wherein the at least one physical asset is an item of physical equipment.

4. The method of claim 1, wherein the respective third topic map meta-models further comprise state transfer information regarding a change of a respective physical asset from a first state to a second state.

5. The method of claim 1, wherein the at least one physical asset comprises items of physical equipment.

6. A computer program product for determining an impact an event, mapped to a representation of the event and identified in a first topic map meta-model of events, will have on at least one physical asset, mapped to a representation of the at least one physical asset and identified in a second topic map meta-model of physical assets, each of the at least one physical asset having a respective state machine in a respective third topic map meta-model of the state machine, the event having a source including a broadcaster, the computer program product comprising one or more computer readable storage media having program instructions embodied therewith, the program instructions being executable by a computer to perform a method comprising:

creating, by the computer, a fourth topic map meta-model that identifies the at least one physical asset and events in a topic map based index with instance ontology based on the second topic map meta-model that identifies the at least one physical asset and the first topic map meta-model that identifies the event, the fourth topic map meta-model semantically mapping the at least one physical asset identified in the second topic map meta-model to the event identified in the first topic map meta-model, impact association between the at least one physical asset and the event in the fourth topic map meta-model representing the semantic mapping of the at least one physical asset to the event and including at least one from a group of a scope, versioning metadata, temporal metadata, directionality of an impact metadata and weights of impact metadata;

associating, by the computer, the respective state machine of each of the third topic map meta-models with one or more corresponding physical assets of the at least one physical asset identified in the fourth topic map meta-model;

receiving, by the computer, an instance of the event identified in the first topic map meta-model from the broadcaster;

adding, by the computer, the instance of the event received from the broadcaster to the fourth topic map meta-model;

running, by the computer, a first impact analysis on the instance of the event received from the broadcaster and mapped to the at least one physical asset identified in the fourth topic map meta-model semantically mapping the at least one physical asset to the event, to determine which of the at least one physical asset identified in the fourth topic map meta-model were impacted by the instance of the event received from the broadcaster added to the fourth topic map meta-model;

running, by the computer, a second impact analysis on an impacted physical asset of the at least one physical asset of the fourth topic map meta-model, determined by the first impact analysis, to determine an operating status and a state of the impacted physical asset due to the instance of the event received from the broadcaster and the state machine of the impacted physical asset; and running, by the computer, a third impact analysis on the operating status and the state of the impacted physical asset, determined by the second impact analysis, due to the instance of the event added to the fourth topic map meta-model to determine and take at least one action to alter the state of the impacted physical asset to remove an impact on the impacted asset based on the first impact analysis of the instance of the event, the second impact analysis on the impacted asset and the third impact analysis on the operating status and the state of the impacted physical asset, using the third topic map meta-model of the state machine associated with the impacted physical asset identified in the fourth topic map meta-model, wherein as new event types are added and as new physical assets are added, the computer generates a new fourth topic map meta-model to semantically map physical assets to events.

7. The computer program product of claim 6, wherein the instance of the event received from the broadcaster comprises at least one failure event for at least one physical asset of the at least one physical asset.

8. The computer program product of claim 7, wherein the at least one physical asset is an item of physical equipment.

9. The computer program product of claim 6, wherein the respective third topic map meta-models further comprise state transfer information regarding a change of a respective physical asset from a first state to a second state.

10. The computer program product of claim 6, wherein the at least one physical asset comprises items of physical equipment.

11. A method of determining an impact of a received burst event on a pipe asset, which can be controlled by or connected to one or more valve assets of a valve system, the burst event represented in a first topic map meta-model, the valve assets and the pipe assets, mapped to respective representations and identified in a second topic map meta-model of physical assets, each of the valve assets and the pipe assets having a respective state machine in a respective third topic map meta-model of the respective state machine, the burst event having a source including a broadcaster, the method comprising the steps of:

a computer creating a fourth topic map meta-model that identifies the valve assets and the pipe assets and events in a topic map based index with instance ontology based on the second topic map meta-model that identifies the valve assets and the pipe assets and the first topic map meta-model that identifies the event, the fourth topic map meta-model semantically mapping at least one from a group of the valve assets and the pipe assets identified in the the second topic map meta-model to the burst event identified in the first topic map meta-model, impact association between the at least one from the group of the valve assets and the pipe assets and the burst event in the fourth topic map meta-model representing the semantic mapping of the at least one from the group of the valve assets and the pipe assets to the burst event and including at least one from a group of a scope, versioning metadata, temporal metadata, directionality of an impact metadata and weights of impact meta-data;

the computer associating the respective state machines of each of the third topic map meta-models with one or more from a group of corresponding valve assets and corresponding pipe assets identified in the fourth topic map meta-model;

the computer receiving an instance of the burst event identified in the first topic map meta-model from the broadcaster;

the computer adding the instance of the received burst event to the fourth topic map meta-model;

the computer running a first impact analysis on the instance of the burst event mapped to one of the pipe assets identified in the fourth topic map meta-model semantically mapping the at least one from the group of the valve assets and the pipe assets to the burst event, to determine which of the valve assets and the pipe assets identified in the fourth topic map meta-model were impacted by the instance of the burst event added to the fourth topic map meta-model and a class category impacted valve assets are in;

the computer running a second impact analysis on each respective impacted valve asset of the impacted class category of the fourth topic map meta-model, determined by the first impact analysis, to determine an operating status and a state of the each respective impacted valve asset due to the instance of the burst event; and the computer running a third impact analysis on the operating status and the state of the each respective impacted valve asset of the impacted class category, determined by the second impact analysis, due to the instance of the burst event added to the fourth topic map meta-model to determine and take at least one action to alter the state of the each respective impacted valve asset of the impacted class category to remove an impact on the each respective impacted valve asset based on the first impact analysis of the instance of the burst event, the second impact analysis on the each respective impacted valve asset of the impacted class category, and the third impact analysis of the operating status and the state of the each respective impacted valve asset of the impacted class category, using the third topic map meta-model of the each respective state machine associated with the each respective impacted valve asset identified in the fourth topic map meta-model, wherein as new event types are added and as new physical assets are added, the computer generates a new fourth topic map meta-model to map physical assets to events.

12. The method of claim 11, wherein the respective third topic map meta-models further comprise state transfer information regarding a change of respective valve assets from a first state to a second state.

13. The method of 12, wherein the first state is a valve open state and the second state is valve closed state.

* * * * *